US009450501B2

(12) United States Patent
Inomata

(10) Patent No.: US 9,450,501 B2
(45) Date of Patent: Sep. 20, 2016

(54) MATRIX CONVERTER HAVING FIRST AND SECOND COMMUTATION CONTROLLERS

(71) Applicant: KABUSHIKI KAISHA YASKAWA DENKI, Kitakyushu-shi (JP)

(72) Inventor: Kentaro Inomata, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 103 days.

(21) Appl. No.: 14/495,895

(22) Filed: Sep. 25, 2014

(65) Prior Publication Data

US 2015/0085551 A1    Mar. 26, 2015

(30) Foreign Application Priority Data

Sep. 26, 2013    (JP) .................................. 2013-199796

(51) Int. Cl.
*H02M 5/297*    (2006.01)
*H02M 5/293*    (2006.01)

(52) U.S. Cl.
CPC .............. *H02M 5/293* (2013.01); *H02M 5/297* (2013.01); *H02M 2005/2932* (2013.01)

(58) Field of Classification Search
CPC ...... H02M 5/14; H02M 5/271; H02M 5/295; H02M 5/293; H02M 5/297; H02M 2001/0022; H02M 2005/2932
USPC .................................................. 363/148–163
See application file for complete search history.

(56) References Cited

U.S. PATENT DOCUMENTS 7,701,740 B2 *   4/2010   Yamanaka ............ H02M 5/297
                                                363/149
8,045,354 B2 *  10/2011   Lacaze .................. H02M 5/271
                                                363/160

(Continued)

FOREIGN PATENT DOCUMENTS

JP          2003-333851          11/2003
JP          2008-048535           2/2008
JP          2010-246174          10/2010

OTHER PUBLICATIONS

State Intellectual Property Office of People's Republic of China; Application No. or Patent No. 201410425580.9 Ilssue Serial No. 2016070100146430 Applicant or Patentee: Kabushiki Kaisha Yaskawa Denki Title of Invention-Creation: Matrix Converter.*

(Continued)

*Primary Examiner* — Yemane Mehari
(74) *Attorney, Agent, or Firm* — Mori & Ward, LLP

(57) ABSTRACT

A matrix converter includes a power converter and a controller. The power converter includes bidirectional switches each having a controllable conducting direction. The bidirectional switches are disposed between input terminals and output terminals. The input terminals are respectively coupled to phases of an AC power source. The output terminals are respectively coupled to phases of a load. The controller controls the bidirectional switches. A first commutation controller performs commutation control when the conducting direction is unidirectional. A second commutation controller performs the commutation control when the conducting direction is bidirectional. A selector selects between the first commutation controller and the second commutation controller to perform the commutation control based on a state of an output current from the power converter.

9 Claims, 23 Drawing Sheets

(56) References Cited

U.S. PATENT DOCUMENTS

2007/0217243 A1* 9/2007 Yamamoto ............ H02M 5/297
363/160
2012/0287686 A1* 11/2012 Yamamoto ............ H02M 5/297
363/78

OTHER PUBLICATIONS

Harada et al., "Proposal of Two-Step Commutation Method for Matrix Converters", 2010 Kyusyu-Section Joint Convention of Institutes of Electrical and Information Engineers, Japan, 2010, P139, 01-1P-12, URL, https://www.istage.jst.go.jp/browse/jceeek/2010/0/_contents/-char/ja/?from=2.

Tammaruckwattana et al., "Comparison of Switching Losses of Matrix Converters for Commutation Methods", Fukuoka Institute of Technology, Jun. 2014.

Japanese Office Action for corresponding JP Application No. 2013-199796, Sep. 1, 2015.

Extended European Search Report for corresponding EP Application No. 14185512.2-1809, Jun. 2, 2015.

Marcus et al., "Rectifier based robust control of bidirectional switches in AC-AC matrix converters", EPE-PEMC 2002 Dubrovnik & Cavtat.

Chinese Office Action for corresponding CN Application No. 201410425580.9, Jul. 6, 2016.

* cited by examiner

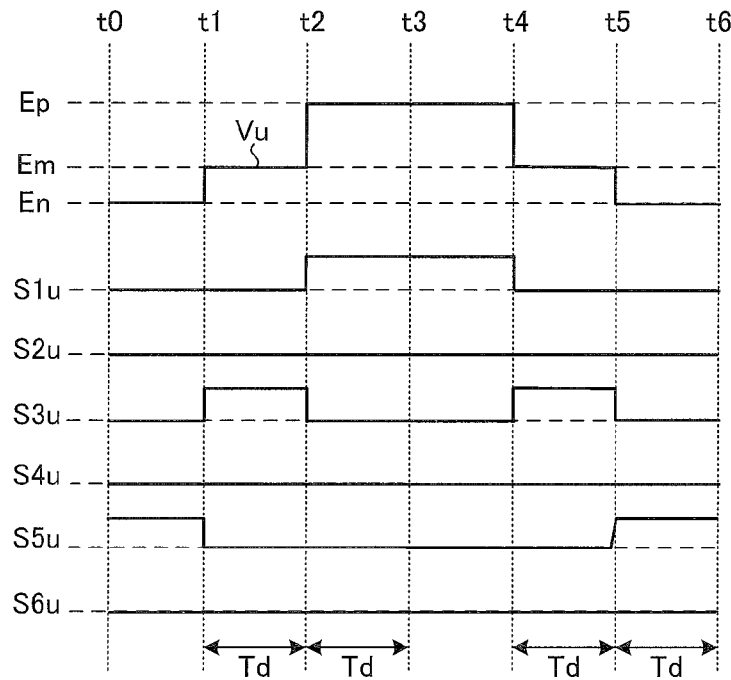
FIG. 8A  *Iu > 0*
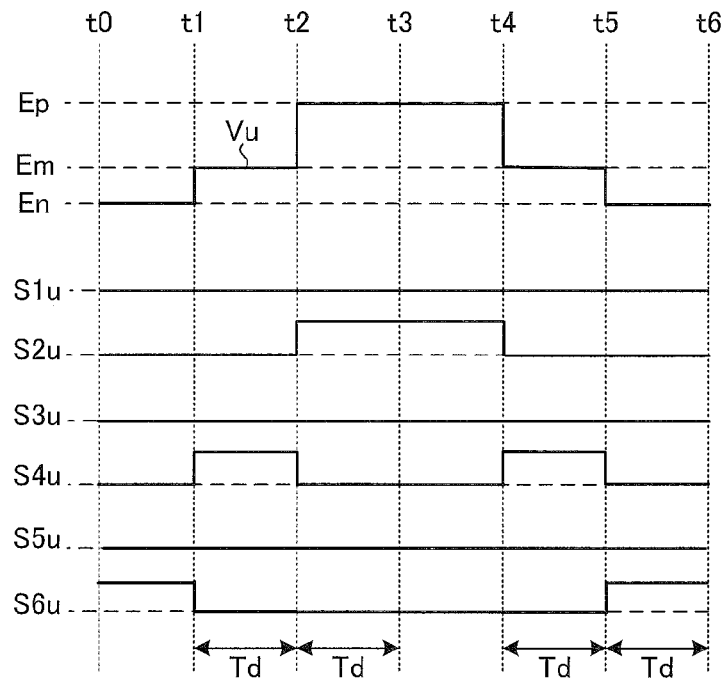
FIG. 8B  *Iu < 0*

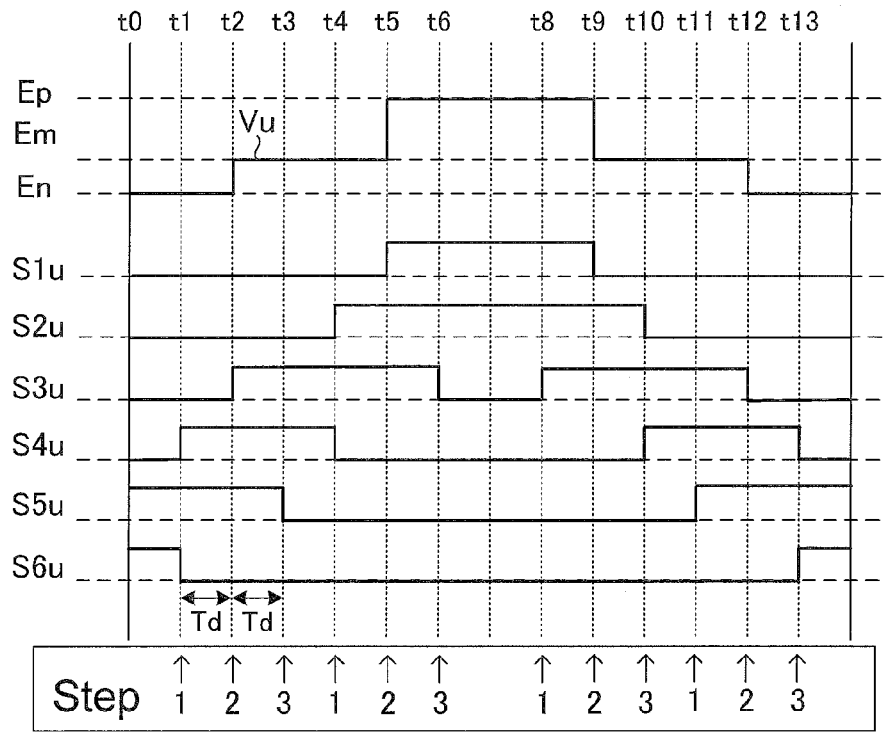
FIG. 12A  Io > 0
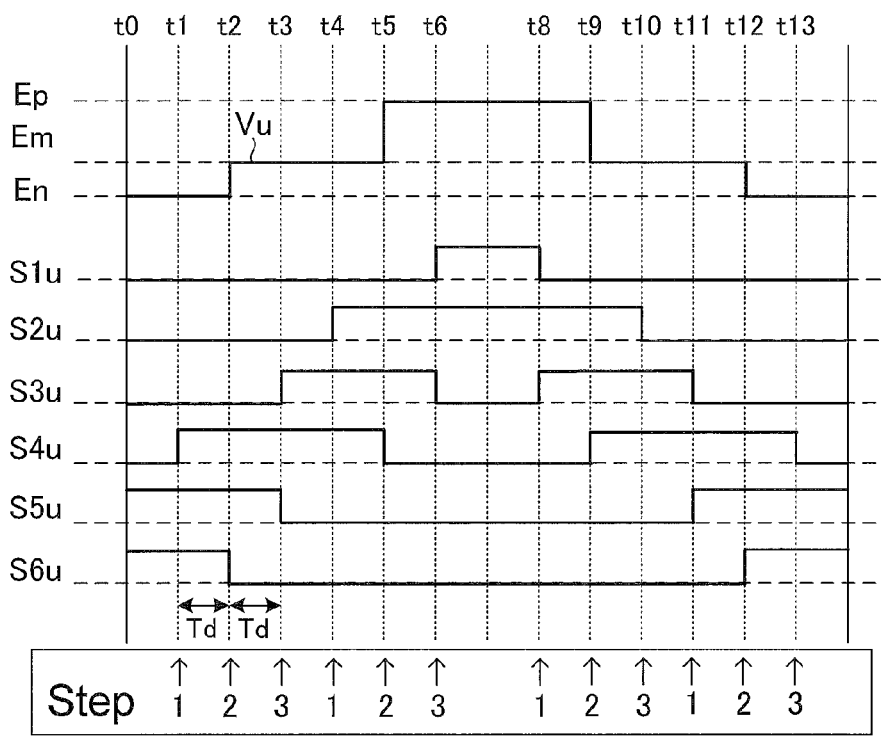
FIG. 12B  Io < 0

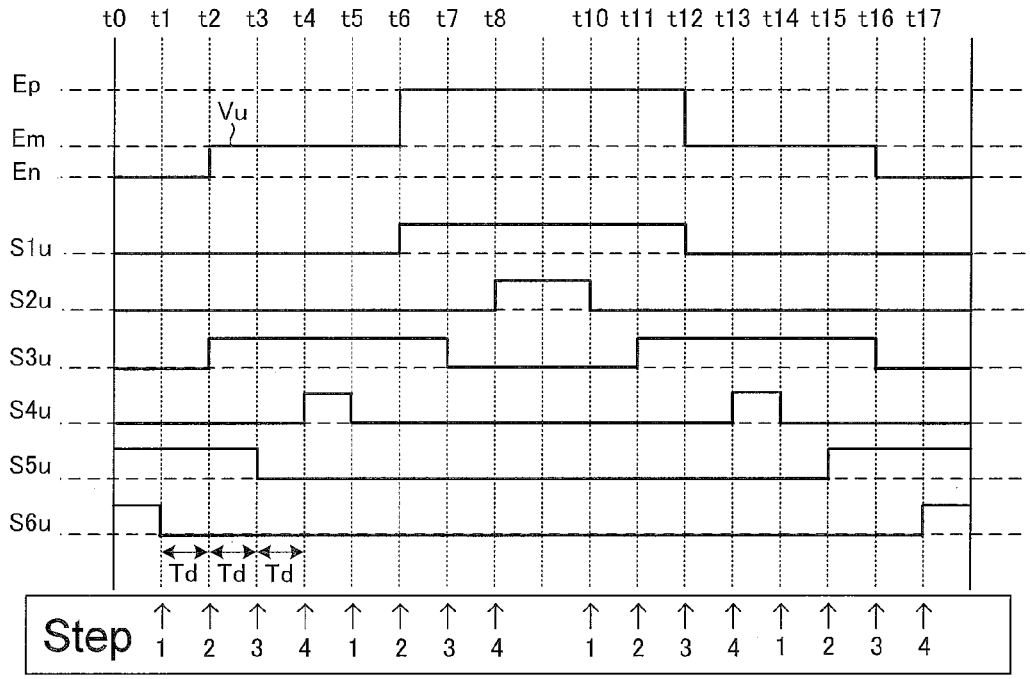
FIG. 15A  $Iu > 0$
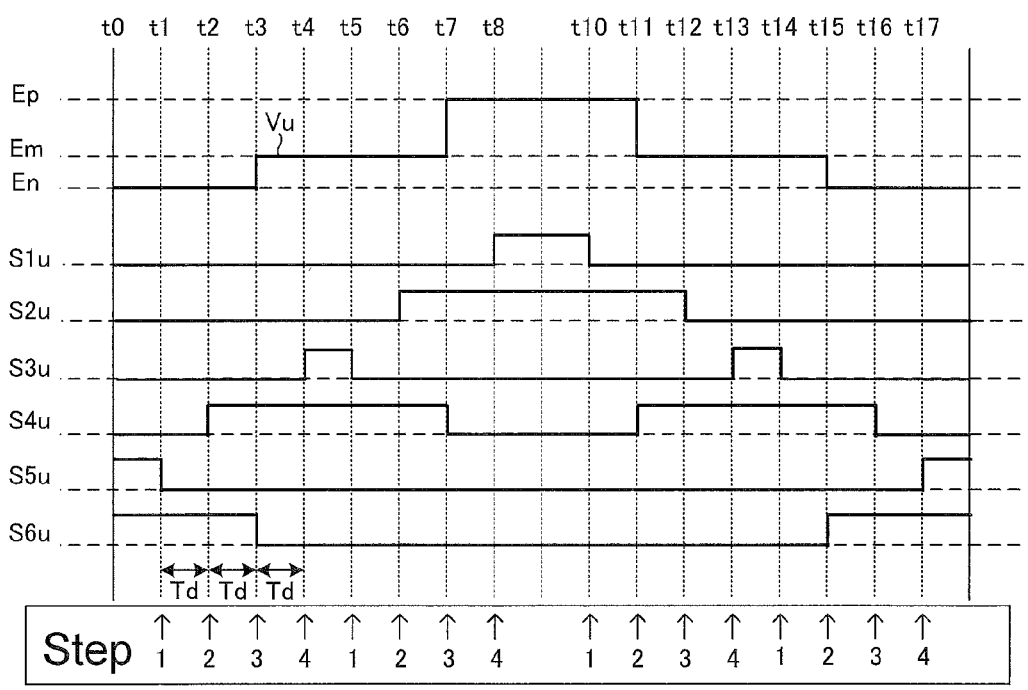
FIG. 15B  $Iu < 0$

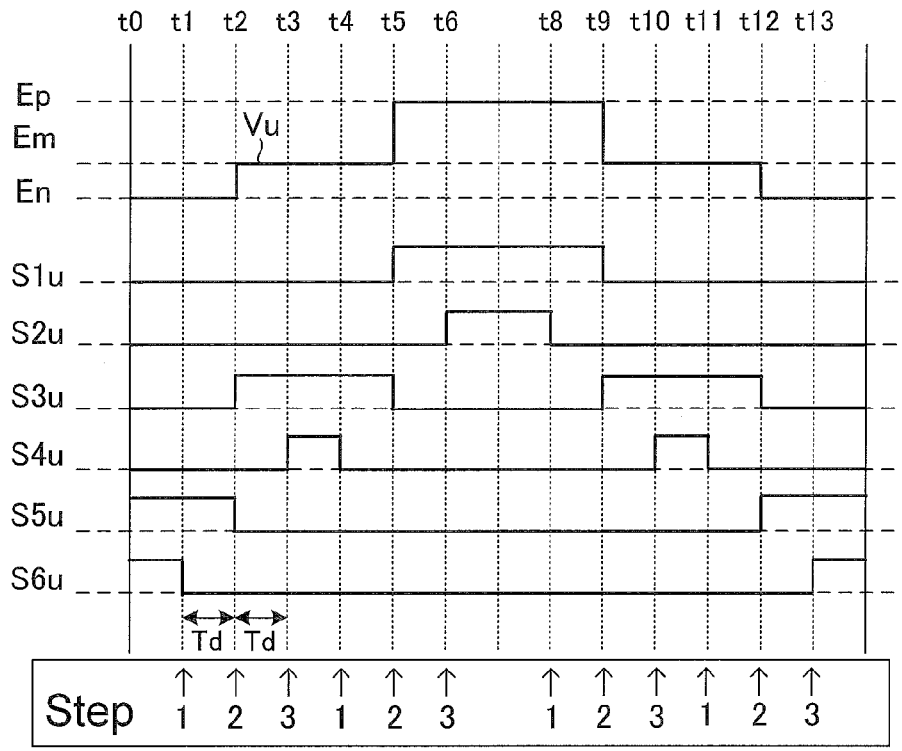
FIG. 17A  Io > 0
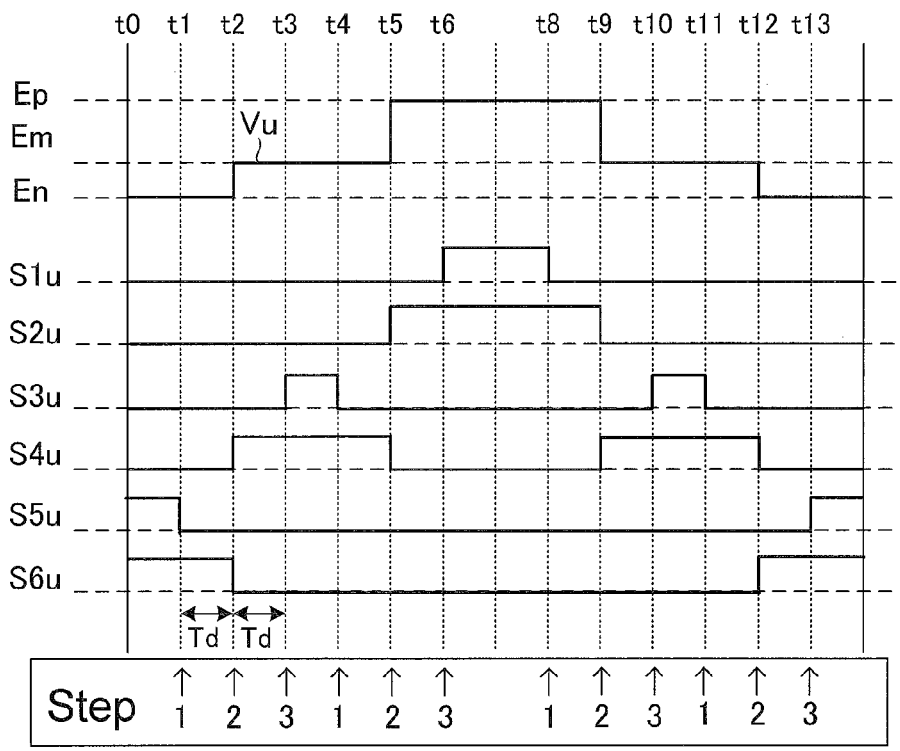
FIG. 17B  Io < 0

FIG. 18A  $I_o > 0$
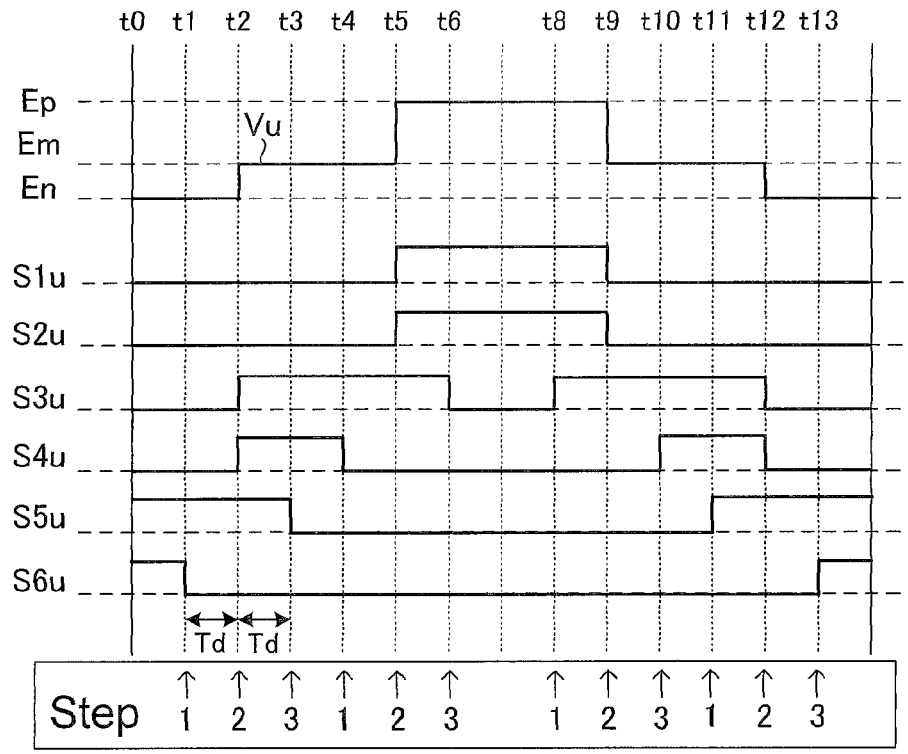
FIG. 18B  $I_o < 0$
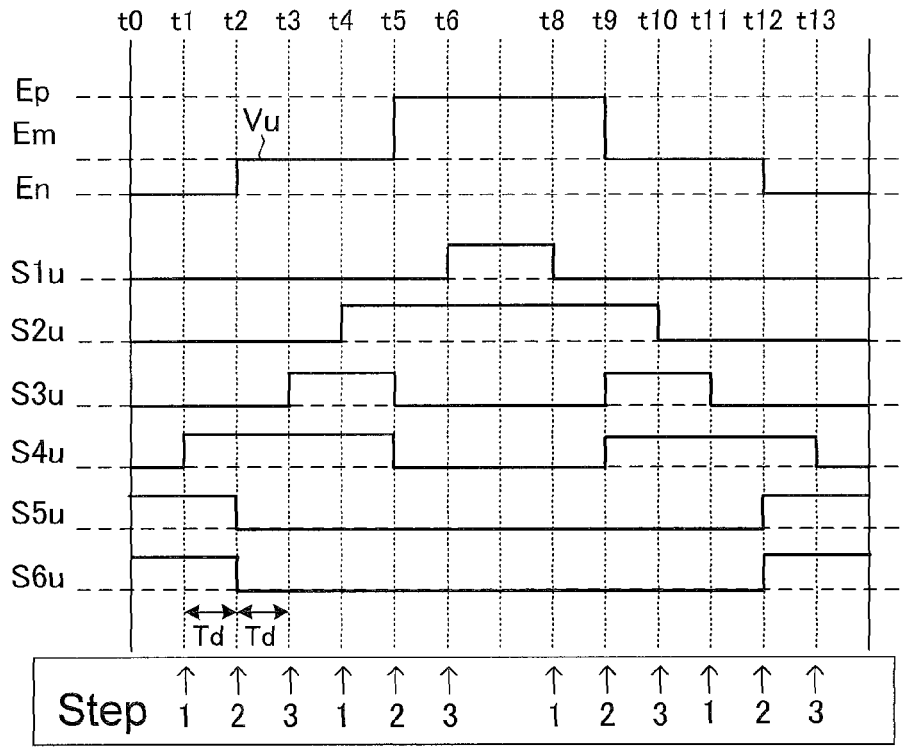

MATRIX CONVERTER HAVING FIRST AND SECOND COMMUTATION CONTROLLERS

CROSS-REFERENCE TO RELATED APPLICATIONS

The present application claims priority under 35 U.S.C. §119 to Japanese Patent Application No. 2013-199796, filed Sep. 26, 2013. The contents of this application are incorporated herein by reference in their entirety.

BACKGROUND

1. Field of the Invention

The present invention relates to a matrix converter.

2. Discussion of the Background

Matrix converters include a plurality of bidirectional switches that couple between an AC (alternating-current) power source and a load. The bidirectional switches are controlled to directly switch phase voltages of the AC power source so as to output a desired voltage and a desired frequency to the load.

The matrix converters perform commutation, which is to switch between the phases of the AC power source to be coupled to the load using a bidirectional switch. Marcus Ziegler and Wilfried Hofmann propose a method of commutation in "*Rectifier based robust control of bidirectional switches in AC-AC matrix converters*" (EPE-PEMC 2002 Dubrovnik & Cavtat). Specifically, a bidirectional switch is switched with its conducting direction being unidirectional depending on the polarity of the output current.

SUMMARY

According to one aspect of the present disclosure, a matrix converter includes a power converter and a controller. The power converter includes a plurality of bidirectional switches each having a controllable conducting direction. The bidirectional switches are disposed between a plurality of input terminals and a plurality of output terminals. The plurality of input terminals are respectively coupled to phases of an AC power source. The plurality of output terminals are respectively coupled to phases of a load. The controller is configured to control the plurality of bidirectional switches. The controller includes a first commutation controller, a second commutation controller, and a selector. The first commutation controller is configured to perform commutation control in a state where the conducting direction of the bidirectional switches is unidirectional. The second commutation controller is configured to perform the commutation control in a state where the conducting direction of the bidirectional switches is bidirectional. The selector is configured to select between the first commutation controller and the second commutation controller to perform the commutation control based on a state of an output current from the power converter.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 8A illustrates a relationship between the output phase voltage and the gate signals in a case where the output phase current is a positive value in another 1-step current commutation;

FIG. 8B illustrates a relationship between the output phase voltage and the gate signals in a case where the output phase current is a negative value in the other 1-step current commutation;

FIG. 12A illustrates a relationship between the output phase voltage and the gate signals in a case where the output phase current is a positive value in a 3-step voltage commutation;

FIG. 12B illustrates a relationship between the output phase voltage and the gate signals in a case where the output phase current is a negative value in the 3-step voltage commutation;

FIG. 15A illustrates a relationship between the output phase voltage and the gate signals in a case where the output phase current is a positive value in a 4-step current commutation;

FIG. 15B illustrates a relationship between the output phase voltage and the gate signals in a case where the output phase current is a negative value in the 4-step current commutation;

FIG. 17A illustrates a relationship between the output phase voltage and the gate signals in a case where the output phase current is a positive value in another 3-step current commutation;

FIG. 17B illustrates a relationship between the output phase voltage and the gate signals in a case where the output phase current is a negative value in the other 3-step current commutation;

FIG. 18A illustrates a relationship between the output phase voltage and the gate signals in a case where the output phase current is a positive value in a 3-step voltage and current commutation;

FIG. 18B illustrates a relationship between the output phase voltage and the gate signals in a case where the output phase current is a negative value in the 3-step voltage and current commutation;

DESCRIPTION OF THE EMBODIMENTS

Figure 1:
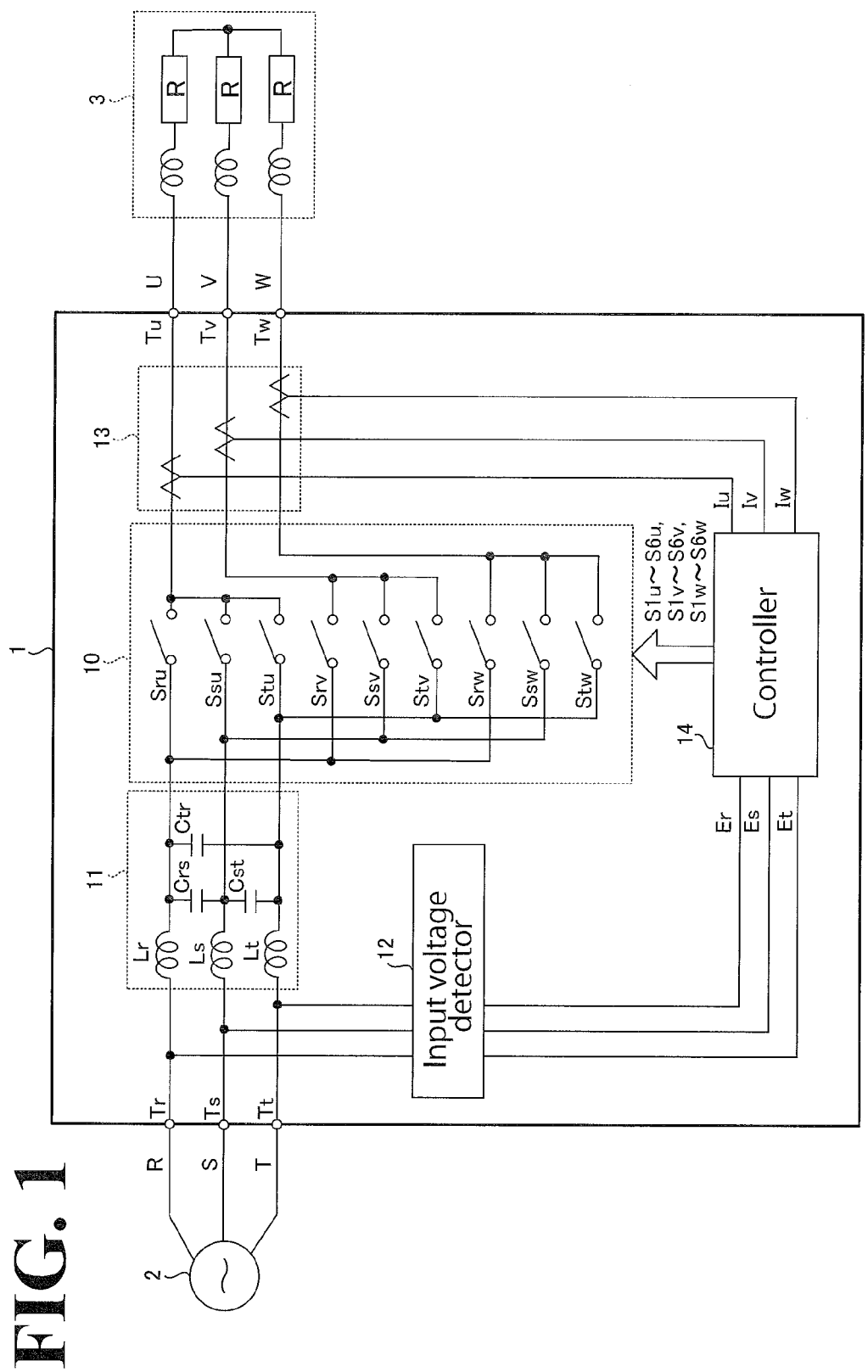
FIG. 1 is a diagram illustrating an exemplary configuration of a matrix converter according to an embodiment.

The embodiments will now be described with reference to the accompanying drawings, wherein like reference numerals designate corresponding or identical elements throughout the various drawings.

<<1. Configuration of the Matrix Converter>>

FIG. 1 shows an exemplary configuration of a matrix converter according to an embodiment. As shown in FIG. 1, a matrix converter 1 according to this embodiment is disposed between a three-phase AC power source 2 (hereinafter simply referred to as AC power source 2) and a load 3. An example of the load 3 is an AC motor. In the following description, an R phase, an S phase, and a T phase of the AC power source 2 will be referred to as input phases, while a U phase, a V phase, and a W phase of the load 3 will be referred to as output phases.

The matrix converter 1 includes input terminals Tr, Ys, and Tt, and output terminals Tu, Tv, and Tw. The R, S, and T phases of the AC power source 2 are respectively coupled to the input terminals Tr, Ts, and Tt. The U, V, and W phases of the load 3 are respectively coupled to the output terminals Tu, Tv, and Tw. The AC power source 2 supplies three-phase AC power to the matrix converter 1 through the input terminals Tr, Ts, and Tt. The matrix converter 1 converts the three-phase AC power into three-phase AC power of a desired voltage and a desired frequency. Then, the matrix converter 1 outputs the resulting three-phase AC power to the load 3 through the output terminals Tu, Tv, and Tw.

As shown in FIG. 1, the matrix converter 1 includes a power converter 10, an LC filter 11, an input voltage detector 12, an output current detector 13, and a controller 14.

The power converter 10 includes a plurality of bidirectional switches, namely, Sru, Ssu, Stu, Srv, Ssv, Sty, Srw, Ssw, and Stw (hereinafter occasionally collectively referred to as bidirectional switch S). The plurality of bidirectional switches couple the phases of the AC power source 2 to the corresponding phases of the load 3.

The bidirectional switches Sru, Ssu, and Stu respectively couple the R, S, and T phases of the AC power source 2 to the U phase of the load 3. The bidirectional switches Srv, Ssv, and Sty respectively couple the R, 5, and T phases of the AC power source 2 to the V phase of the load 3. The bidirectional switches Srw, Ssw, and Stw respectively couple the R, S, and T phases of the AC power source 2 to the W phase of the load 3.

Figure 2:
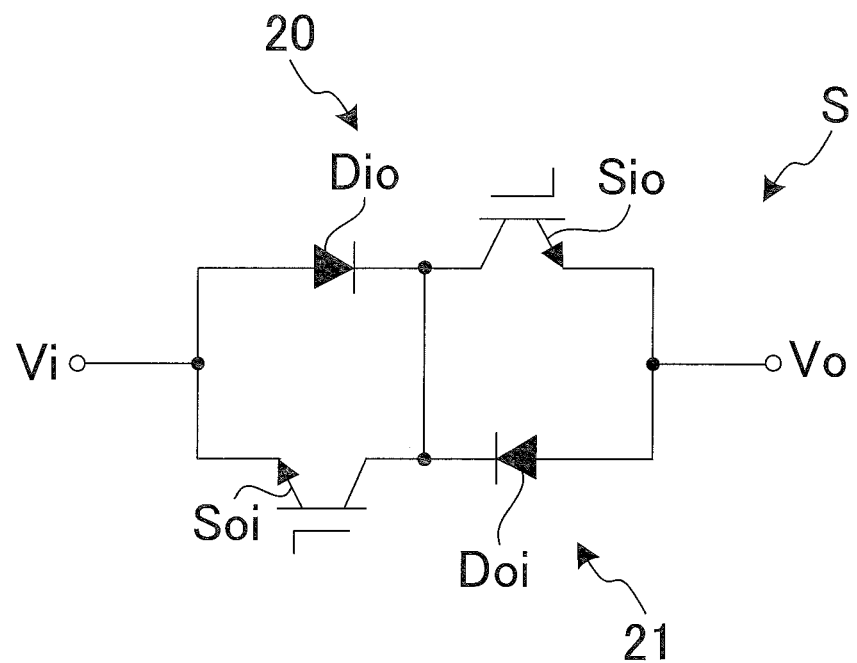
FIG. 2 is a diagram illustrating an exemplary configuration of a bidirectional switch shown in FIG. 1.

The bidirectional switch S is made up of an anti-parallel connection of serial connection bodies each made up of a unidirectional switch and a diode. FIG. 2 shows an exemplary configuration of the bidirectional switch S. As shown in FIG. 2, the bidirectional switch S includes a serial connection body 20 and a serial connection body 21. The serial connection body 20 is made up of a unidirectional switch Sio and a diode Dio, and the serial connection body 21 is made up of a unidirectional switch Soi and a diode Doi. The serial connection body 20 and the serial connection body 21 are anti-parallely connected to each other.

Examples of the unidirectional switches Sio and Soi include, but are not limited to, semiconductor switching elements such as metal-oxide-semiconductor field-effect transistor (MOSFET) and insulated gate bipolar transistor (IGBT). Other examples include next generation semiconductor switching elements such as SiC and GaN.

The bidirectional switch S will not be limited to the configuration shown in FIG. 2. Another example of the bidirectional switch S is that the cathode of the diode Dio and the cathode of the diode Doi are not coupled to each other. When the unidirectional switches Sio and Soi are reverse blocking IGBTs, the bidirectional switch S may not be provided with the diodes Dio and Doi, and the unidirectional switches Sio and Soi may be anti-parallely connected to each other. Reverse blocking IGBTs are a kind of IGBT that has a tolerance against reverse bias (a state where voltage is higher on the emitter side than on the collector side of IGBT).

The LC filter 11 is disposed between the power converter 10 and the R, S, and T phases of the AC power source 2 to eliminate or minimize a flow of high frequency current from the power converter 10 to the AC power source 2. Specifically, the LC filter 11 includes three reactors Lr, Ls, and Lt and three capacitors Crs, Cst, and Ctr, and removes high frequency components resulting from switching of the bidirectional switch S of the power converter 10.

The input voltage detector 12 detects voltage values Er, Es, and Et (hereinafter referred to as input phase voltages Er, Es, and Et) respectively of the R, S, and T phases of the AC power source 2. In the following description, the input phase voltages Er, Es, and Et may be occasionally collectively referred to as input voltage Vi. Also, inter-input phase voltages Ers, Est, and Etr may be occasionally collectively referred to as inter-input phase voltage Esa. Here, the following applies: Ers=Er−Es, Est=Es−Et, and Etr=Et−Er.

The output current detector 13 detects the current flowing between the power converter 10 and the load 3. Specifically, the output current detector 13 detects instantaneous values Iu, Iv, and Iw (hereinafter referred to as output phase currents Iu, Iv, and Iw) of the currents flowing between the power converter 10 and the U, V, and W phases of the load 3. In the following description, the output phase currents Iu, Iv, and Iw may be occasionally collectively referred to as output current Io. Also, instantaneous values of the voltages respectively output to the U, V, and W phases of the load 3 from the power converter 10 may be occasionally referred to as output phase voltages Vu, Vv, and Vw. The output phase voltages Vu, Vv, and Vw may be occasionally collectively referred to as output voltage Vo.

The controller 14 generates gate signals S1$u$ to S6$u$, S1$v$ to S6$v$, and S1$w$ to S6$w$ based on the input phase voltages Er, Es, and Et detected by the input voltage detector 12 and based on the output phase currents Iu, Iv, and Iw detected by the output current detector 13. In the following description, the gate signals S1$u$ to S6$u$, S1$y$ to S6$v$, and S1$w$ to S6$w$ may be occasionally collectively referred to as gate signal Sg.

<<2. Configuration of the Controller 14>>

Figure 3:
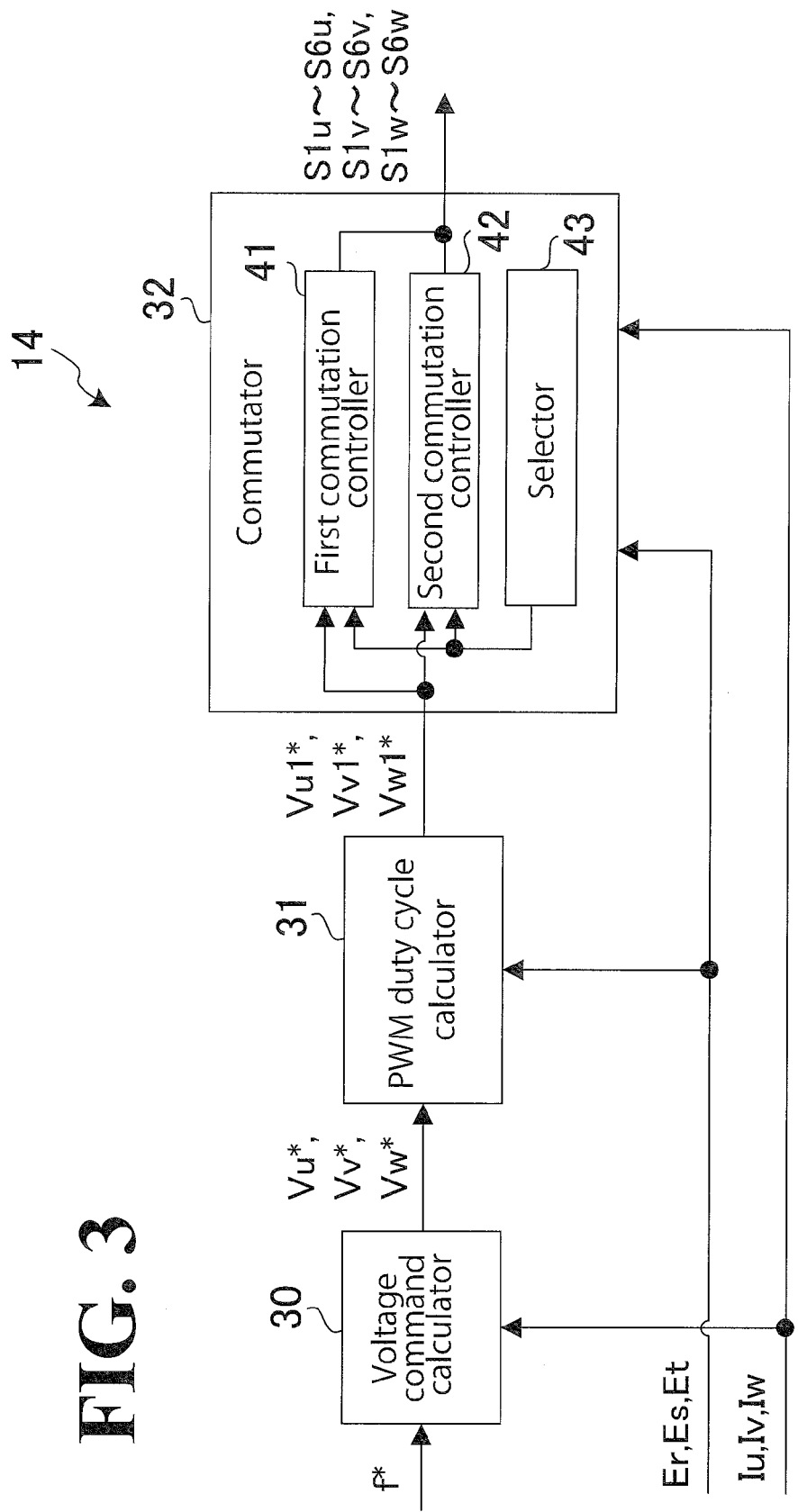
FIG. 3 is a diagram illustrating an exemplary configuration of a controller shown in FIG. 1.

FIG. 3 shows an exemplary configuration of the controller 14. As shown in FIG. 3, the controller 14 includes a voltage command calculator 30, a PWM duty ratio calculator 31, and a commutator 32. The controller 14 includes a microcomputer and various circuits. The microcomputer includes a central processing unit (CPU), a read only memory (ROM), a random access memory (RAM), and an input-output port. The CPU of the microcomputer reads and executes a program stored in the ROM to function as the voltage command calculator 30, the PWM duty ratio calculator 31, and the commutator 32. It is possible to implement the controller 14 using hardware alone, without using any programs.

<<2.1 Voltage Command Calculator 30>>

Based on a frequency command f* and the output phase currents Iu, Iv, and Iw, the voltage command calculator 30 generates voltage commands Vu*, Vv*, and Vw* (hereinafter occasionally collectively referred to as voltage command Vo*) for the respective output phases. Then, the voltage command calculator 30 outputs the voltage commands Vu*, Vv*, and Vw*. The frequency command f* is a command associated with the frequencies of the output phase voltages Vu, Vv, and Vw.

<<2.2 Pwm Duty Ratio Calculator 31>>

Based on the voltage commands Vu*, Vv*, and Vw* and based on the input phase voltages Er, Es, and Et, the PWM duty ratio calculator 31 generates PWM voltage commands Vu1*, Vv1*, and Vw1*. It is possible to use any known technique to generate the PWM voltage commands Vu1*, Vv1*, and Vw1*. Exemplary techniques are described in Japanese Unexamined Patent Application Publication No. 2008-048550 and Japanese Unexamined Patent Application Publication No. 2012-239265.

For example, during a period of unchanging relationship in magnitude among the input phase voltages Er, Es, and Et, the PWM duty ratio calculator 31 makes the input phase voltages Er, Es, and Et into input phase voltages Ep, Em, and En in descending order. Then, the PWM duty ratio calculator 31 converts the voltage commands Vu*, Vv*, and Vw* into pulse width modulation signals corresponding to the voltage values of the input phase voltages Ep, Em, and En. Then, the PWM duty ratio calculator 31 outputs the resulting PWM voltage commands Vu1*, Vv1*, and Vw1*. In the following description, the PWM voltage commands Vu1*, Vv1*, and Vw1* may be occasionally collectively referred to as PWM voltage command Vo1*.

<<2.3 Commutator 32>>

The commutator 32 executes commutation control, which is to switch the phases of the AC power source 2 to be coupled to the load 3 using the bidirectional switch S. Specifically, in response to the PWM voltage commands Vu1*, Vv1*, and Vw1*, the commutator 32 determines the switching order of the bidirectional switch S at the time of commutation based on the polarity of each of the output phase currents Iu, Iv, and Iw and based on the input phase voltages Ep, Em, and En. Based on the switching order thus determined, the commutator 32 generates the gate signals S1$u$ to S6$u$, S1$v$ to S6$v$, and S1$w$ to S6$w$.

The gate signals S1$u$ to S6$u$, S1$v$ to S6$v$, and S1$w$ to S6$w$ are input into each of the unidirectional switches Sio and Soi of the bidirectional switch S of the power converter 10. Thus, the unidirectional switches Sio and Soi are ON-OFF controlled.

Figure 4:
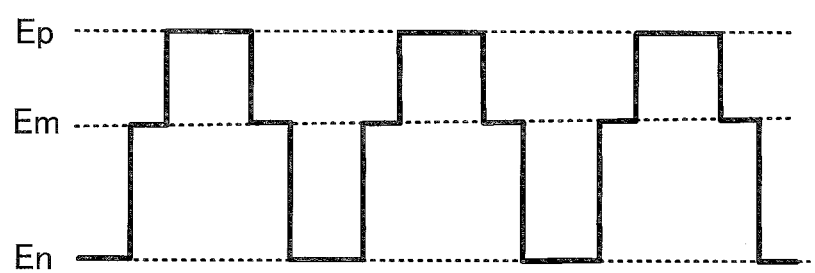
FIG. 4 is a diagram illustrating switching among input phase voltages output to output phases.

FIG. 4 is a diagram illustrating switching among the input phase voltages Ep, Em, and En, which are output to the output phases. The bidirectional switch S is controlled by the gate signal Sg in the manner shown in FIG. 4, where the input phase voltage output to each output phase switches in the order: En→Em→Ep→Em→En in a single cycle Tc of the PWM voltage command Vo1*, which is a pulse width modulation signal. The switching order of the input phase voltage to be output to the output phases is not limited to En→Em→Ep→Em→En.

Figure 5:
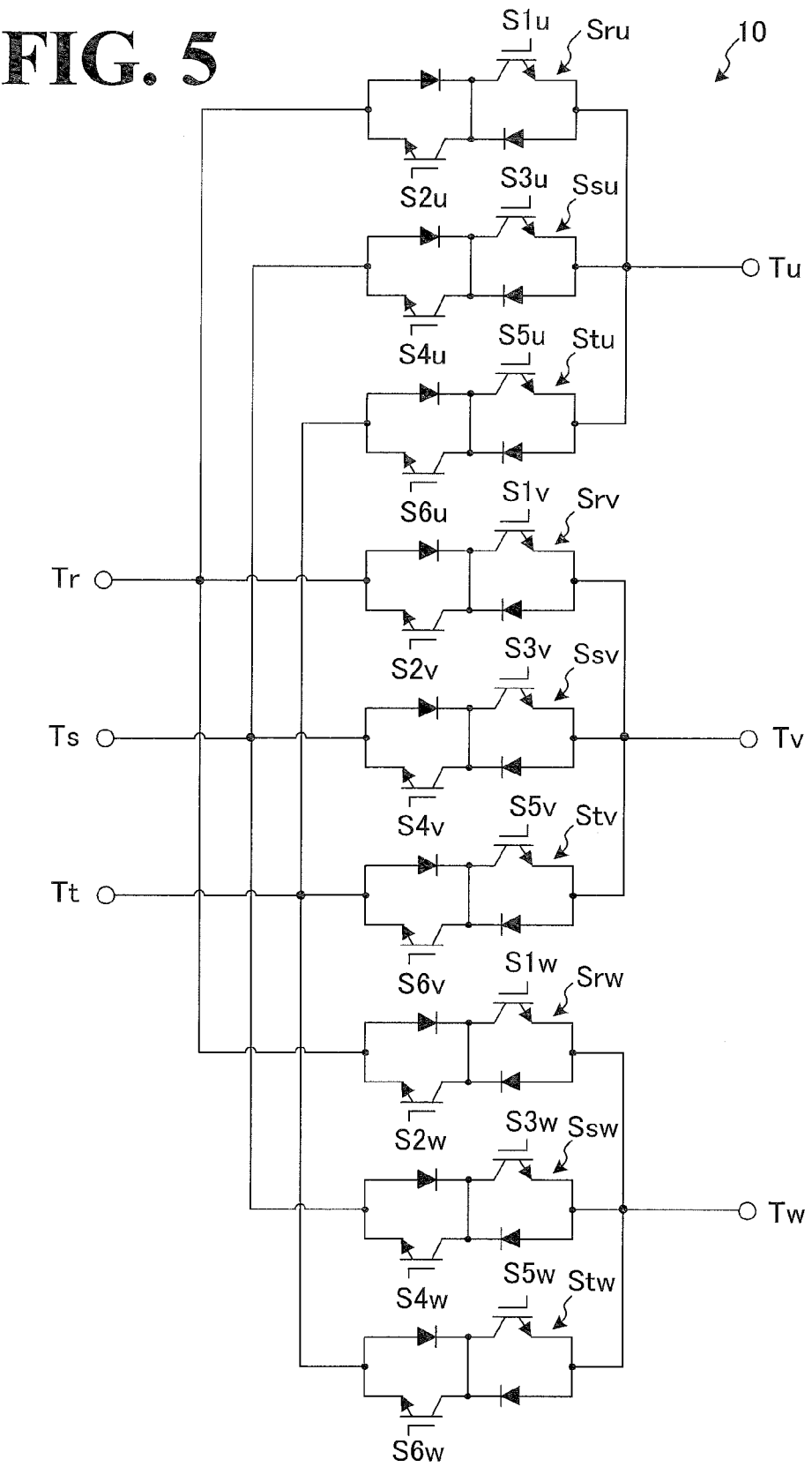
FIG. 5 illustrates a relationship between unidirectional switches of a plurality of bidirectional switches and gate signals.

FIG. 5 illustrates a relationship between the unidirectional switches Sio and Soi of the plurality of bidirectional switches Sru, Ssu, Stu, Srv, Ssv, Stv, Srw, Ssw, and Stw and the gate signals S1$u$ to S6$u$, S1$v$ to S6$v$, and S1$w$ to S6$w$. The LC filter 11 and the output current detector 13 are omitted in FIG. 5.

The unidirectional switch Sio (see FIG. 2) of the bidirectional switch Sru is ON-OFF controlled by the gate signal S1$u$, and the unidirectional switch Soi (see FIG. 2) of the bidirectional switch Sru is controlled by the gate signal S2$u$. The unidirectional switch Sio of the bidirectional switch Ssu is ON-OFF controlled by the gate signal S3$u$, and the unidirectional switch Soi of the bidirectional switch Ssu is controlled by the gate signal S4$u$. The unidirectional switch Sio of the bidirectional switch Stu is ON-OFF controlled by the gate signal S5$u$, and the unidirectional switch Soi of the bidirectional switch Stu is controlled by the gate signal S6$u$.

Similarly, the unidirectional switches Sio and Soi of the bidirectional switches Srv, Ssv, and Sty are ON-OFF controlled by the gate signals S1$v$ to S6$v$. The unidirectional switches Sio and Soi of the bidirectional switches Srw, Ssw, and Stw are ON-OFF controlled by the gate signals S1$w$ to S6$w$.

Referring back to FIG. 3, the controller 14 will be further described. The commutator 32 includes a first commutation controller 41, a second commutation controller 42, and a selector 43. The first and second commutation controllers 41 and 42 are both capable of determining the switching order of the bidirectional switches and generating the gate signals S1$u$ to S6$u$, S1$v$ to S6$v$, and S1$w$ to S6$w$.

The selector 43 selects one of the first and second commutation controllers 41 and 42 based on the states of the output phase currents Iu, Iv, and Iw. Then, the selector 43 causes the selected commutation controller to output the gate signals S1$u$ to S6$u$, S1$v$ to S6$v$, and S1$w$ to S6$w$. This improves the accuracy of the output voltage Vo. The configurations of the first commutation controller 41, the second commutation controller 42, and the selector 43 will be described in detail below.

<<2.3.1 First Commutation Controller 41>>

The first commutation controller 41 performs the commutation control in a state where the conducting direction of the bidirectional switch S is unidirectional. In a commutation method based on this commutation control (such method will be hereinafter referred to as unidirectional switching commutation), one of the unidirectional switches Sio and Soi of the bidirectional switch S is turned OFF, while the other one of the unidirectional switches is ON-OFF controlled. Thus, the unidirectional switching commutation shortens the time required for the commutation operation and improves voltage accuracy.

Examples of the unidirectional switching commutation include 1-step current commutation and 2-step current commutation. The first commutation controller 41, by setting its inner parameters, is capable of using any one of the 1-step current commutation and the 2-step current commutation in performing the commutation control. The first commutation controller 41 generates the gate signals S1$u$ to S6$u$, S1$v$ to S6$v$, and S1$w$ to S6$w$ for performing the PWM control including the commutation operation that is based on the unidirectional switching commutation.

First, the 1-step current commutation will be described by referring to FIGS. 6A, 6B, 7A, and 7B. Here, each of the 1-step current commutation and the 2-step current commutation is similar throughout the U, V, and W phases, and the following description will take the U phase as an example. Also in the following description, the polarity of the output current Io flowing from the AC power source 2 to the load 3 will be regarded as positive (Io>0).

Figure 6A:
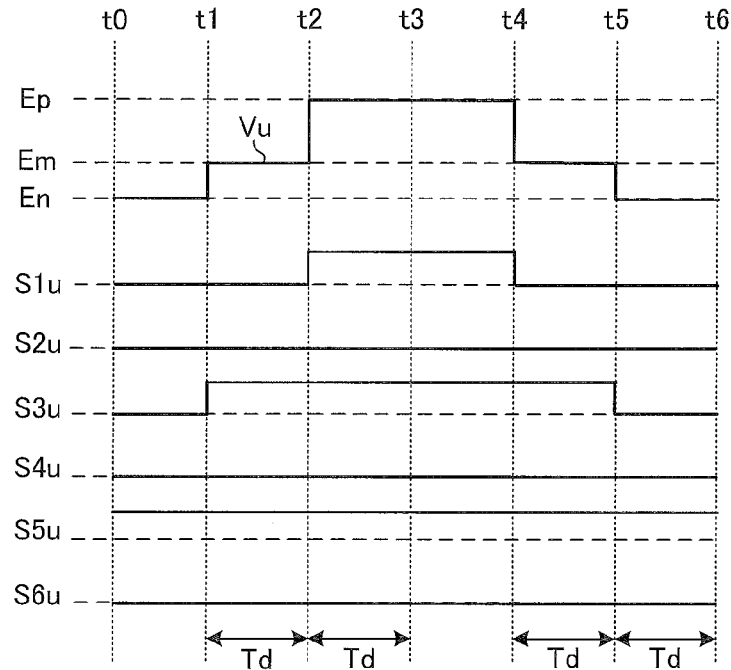
FIG. 6A illustrates a relationship between an output phase voltage and gate signals in a case where an output phase current is a positive value in a 1-step current commutation.
Figure 6B:
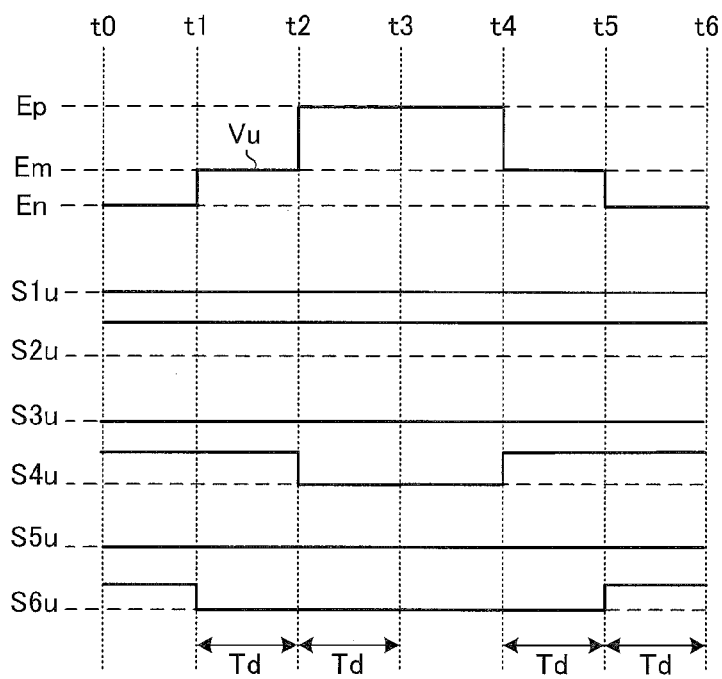
FIG. 6B illustrates a relationship between the output phase voltage and the gate signals in a case where the output phase current is a negative value in the 1-step current commutation.
Figure 7A:
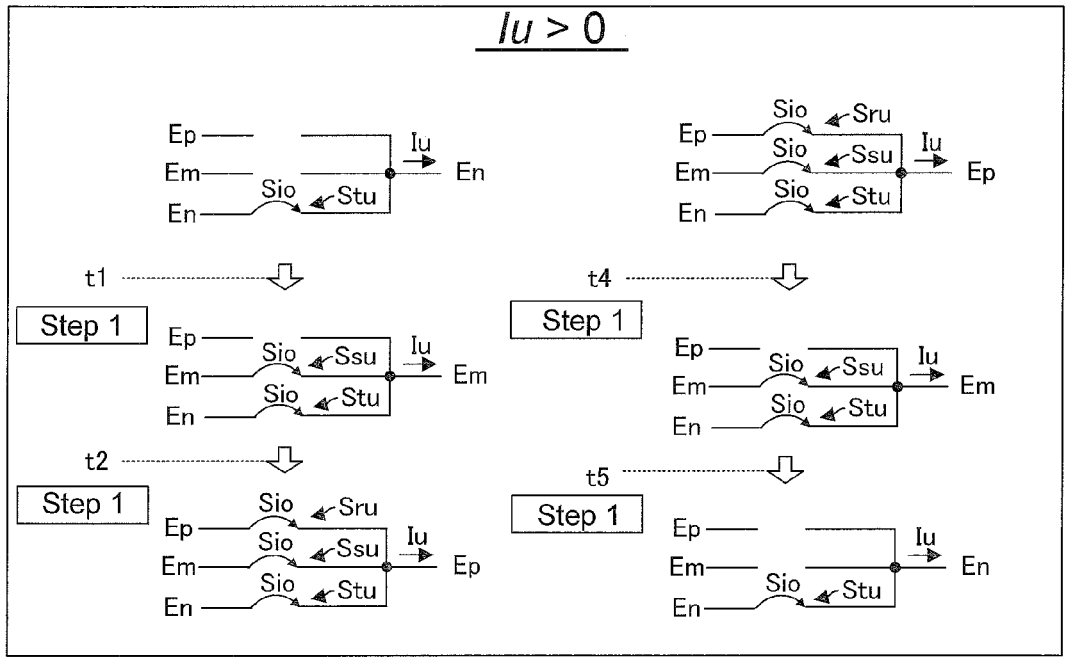
FIG. 7A illustrates states of the unidirectional switch in the 1-step current commutation shown in FIG. 6A.
Figure 7B:
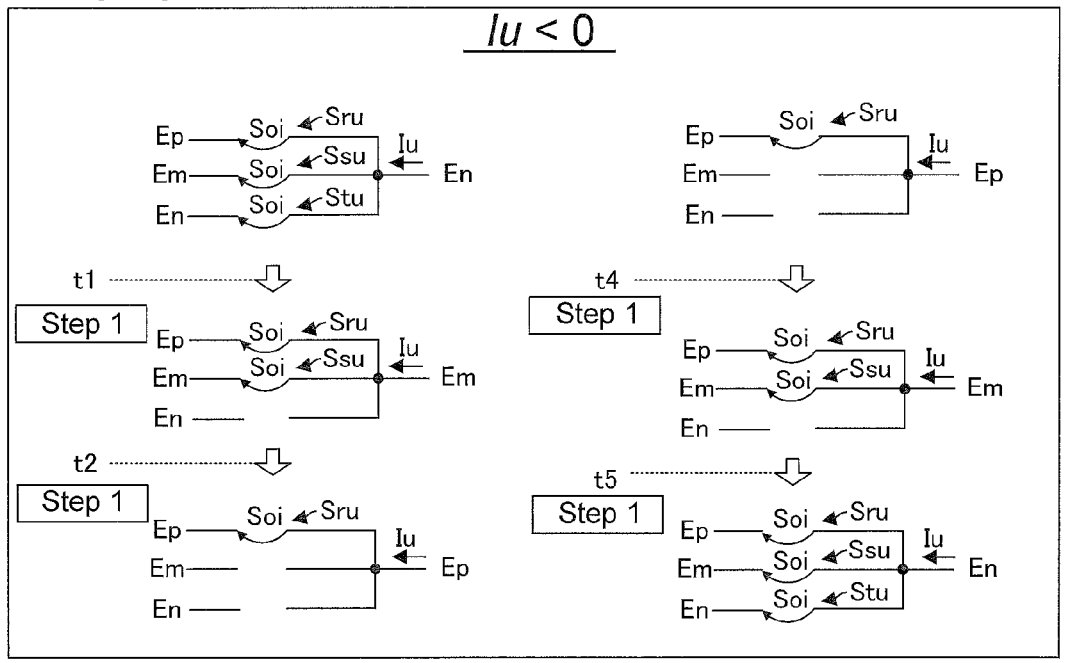
FIG. 7B illustrates a state of the unidirectional switch in the 1-step current commutation shown in FIG. 6B.

FIGS. 6A and 6B illustrate relationships in the 1-step current commutation between the output phase voltage Vu and the gate signals S1$u$ to S6$u$. FIG. 6A illustrates the commutation operation in a case where the output phase current Iu is a positive value. FIG. 6B illustrates the commutation operation in a case where the output phase current Iu is a negative value. FIGS. 7A and 7B illustrate states of the unidirectional switches Sio and Soi at time t0 to time t5 shown in FIGS. 6A and 6B. Here, the following applies: Ep=Er, Em=Es, and En=Et.

As shown in FIG. 6A, where the output phase current Iu is a positive value, at time t0, which is before the start of the commutation operation, the gate signal S5$u$ is at High level, while the gate signals S1$u$ to S4$u$ and S6$u$ are at Low level. This state is as shown in FIG. 7A, where in the bidirectional switch Stu serving as a switching source, the unidirectional switch Sio is ON, while the other unidirectional switch Soi is OFF. The conduction direction of the unidirectional switch Sio is the same as the direction of flow of the output phase current Iu. In this state, the input phase voltage En is output to the U phase.

Then, at time t1, which is when the commutation operation starts, the gate signal S3$u$ changes from Low level to High level. This state is as shown in FIG. 7A, where the unidirectional switch Sio is turned ON in the bidirectional switch Ssu serving as a switching destination. The conduction direction of the unidirectional switch Sio is the same as the direction of flow of the output phase current Iu. As a result, the input phase voltage output to the U phase is switched from En to Em, and continues to be output to the U phase. In each of the bidirectional switches Sru, Ssu, and Stu, the unidirectional switch Soi is OFF, even though the unidirectional switch Soi has a conduction direction opposite to the direction of flow of the output phase current Iu. This ensures that no interphase short-circuiting of the AC power source 2 occurs.

Next, at time t2, the gate signal S1$u$ changes from Low level to High level. This state is as shown in FIG. 7A, where the unidirectional switch Sio is turned ON in the bidirectional switch Sru serving as the switching destination. The conduction direction of the unidirectional switch Sio is the same as the direction of flow of the output phase current Iu. As a result, the input phase voltage output to the U phase is switched to Ep without interphase short-circuiting of the AC power source 2, and the input phase voltage continues to be output to the U phase.

Next, at time t4, the gate signal S1$u$ changes from High level to Low level. This state is as shown in FIG. 7A, where the unidirectional switch Sio is turned OFF in the bidirectional switch Sru serving as the switching destination. As a result, the input phase voltage output to the U phase is switched to Em without interphase short-circuiting of the AC power source 2, and the input phase voltage continues to be output to the U phase.

Next, at time t5, the gate signal S3$u$ changes from High level to Low level. This state is as shown in FIG. 7A, where the unidirectional switch Sio is turned OFF in the bidirectional switch Ssu serving as the switching destination. As a result, the input phase voltage output to the U phase is switched to En without interphase short-circuiting of the AC power source 2, and the input phase voltage continues to be output to the U phase.

The switching processing at time t1, time t2, time t4, and time t5 shown in FIG. 6B is similar to the switching processing at time t1, time t2, time t4, and time t5 shown in FIG. 6A. As shown in FIG. 7B, switching processing is performed with respect to the unidirectional switch Soi, which has the same conducting direction as the direction of flow of the output phase current Iu.

Thus, in the 1-step current commutation, the voltage to be output as the output phase voltage Vu is changeable in the order En→Em→Ep→Em→En. At the same time, interphase short-circuiting of the AC power source 2 is eliminated or minimized, and opening of the output phase of the matrix converter 1 is eliminated or minimized. Also in the 1-step current commutation, the input phase voltage output to the output phase is switchable on a one-step basis. This shortens the time required for the commutation operation and improves the voltage accuracy of the output phase.

In the above-described 1-step current commutation, one unidirectional switch corresponding to the input phase voltage output to each output phase is turned ON, and also one unidirectional switch corresponding to the input phase voltage having an absolute value smaller than the input phase voltage output to each output phase is turned ON. The 1-step current commutation, however, will not be limited to this switch control.

Another possible example of 1-step current commutation is shown in FIGS. 8A and 8B. In this 1-step current commutation, only the one unidirectional switch corresponding to the input phase voltage output to each output phase is turned ON on a one-step basis. FIGS. 8A and 8B are diagrams respectively corresponding to FIGS. 6A and 6B, and illustrate relationships between the output phase voltage Vu and the gate signals S1$u$ to S6$u$ in the other 1-step current commutation.

As described above, the unidirectional switching commutation includes the 2-step current commutation. In the 2-step current commutation, the input phase voltage output to each output phase is switched in two steps 1 and 2. In the 2-step current commutation, among the bidirectional switch S serving as the switching destination, a unidirectional switch with a conducting direction that is the same as the direction of the output current Io is turned ON (step 1). Then, in the bidirectional switch S serving as the switching source, a unidirectional switch with a conducting direction that is the same as the direction of the output current Io is turned OFF (step 2).

Figure 9A:
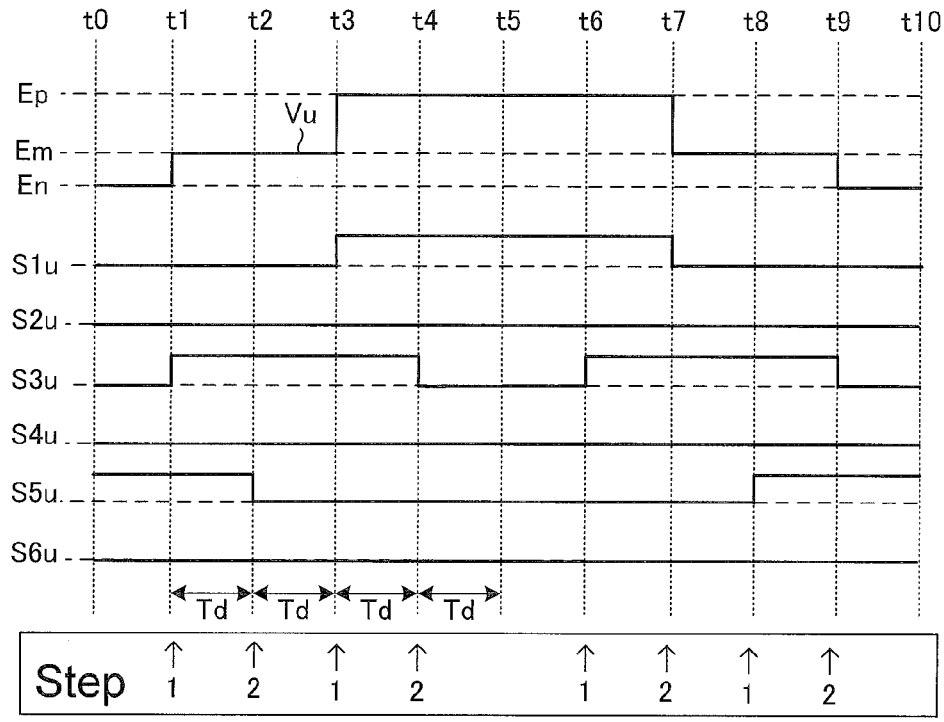
FIG. 9A illustrates a relationship between the output phase voltage and the gate signals in a case where the output phase current is a positive value in a 2-step current commutation.
Figure 9B:
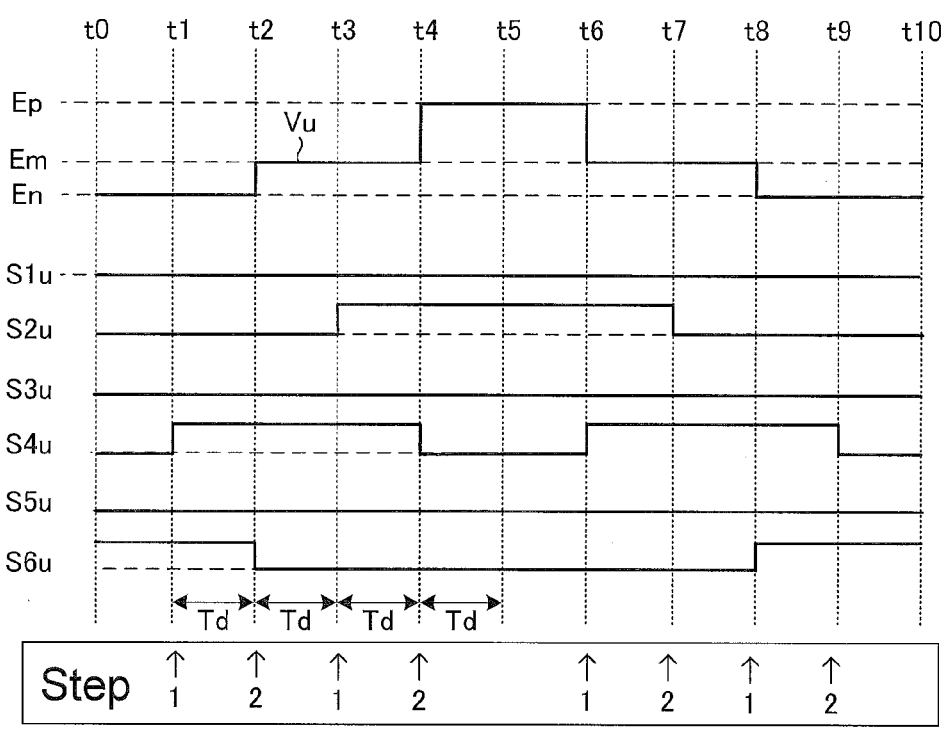
FIG. 9B illustrates a relationship between the output phase voltage and the gate signals in a case where the output phase current is a negative value in the 2-step current commutation.

FIGS. 9A and 9B illustrate the 2-step current commutation and respectively correspond to FIGS. 6A and 6B. Specifically, FIGS. 9A and 9B illustrate relationships between the output phase voltage Vu and the gate signals S1$u$ to S6$u$ in the 2-step current commutation. Each step has a time length of Td (hereinafter referred to as step time length Td). The step time length Td is longer than turn-ON time of the unidirectional switches Sio and Soi. While the steps have the same step time length Td for convenience of description, the steps may have mutually different step time lengths.

<<2.3.2 Second Commutation Controller 42>>

The second commutation controller 42 performs the commutation control in a state where the conducing direction of the bidirectional switch S is bidirectional. In a commutation method based on this commutation control (such method will be hereinafter referred to as bidirectional switching commutation), the unidirectional switches Sio and Soi of the bidirectional switches S serving as the switching source and destination are both ON controlled before and after the commutation operation. Thus, in the bidirectional switching commutation, even when the polarity of the output current Io is incorrect, a resulting commutation failure is within the commutation operation period. The term commutation failure refers to a state where interphase short-circuiting of the AC power source 2 occurs or the output phase goes into open state.

Examples of the bidirectional switching commutation include 4-step voltage commutation, 3-step voltage commutation, 2-step voltage commutation, 4-step current commutation, 3-step current commutation, and 3-step voltage and current commutation. The second commutation controller 42, by setting its inner parameters, is capable of using any of the commutations in performing the commutation control. The second commutation controller 42 generates the gate signals S1$u$ to S6$u$, S1$v$ to S6$v$, and S1$w$ to S6$w$ for performing the PWM control including the commutation operation that is based on the bidirectional switching commutation.

(4-Step Voltage Commutation)

First, the 4-step voltage commutation will be described. The 4-step voltage commutation is such a method of commutation that in order to eliminate or minimize inter-input phase short-circuiting and opening of the output phase, the ON-OFF order of the unidirectional switches Sio and Soi of the bidirectional switches S serving as the switching source and destination is determined based on a relationship in magnitude among the input phase voltages Er, Es, and Et. In the 4-step voltage commutation, the commutation operation is based on a switching pattern of the following steps 1 to 4. In the 4-step voltage commutation, it is not necessary to change the switching pattern depending on the polarity of the output current Io.

Step 1: Turn ON a reverse biased unidirectional switch in a switching destination.
Step 2: Turn OFF a reverse biased unidirectional switch in a switching source.
Step 3: Turn ON a forward biased unidirectional switch in the switching destination.
Step 4: Turn OFF a forward biased unidirectional switch in the switching source.

In the unidirectional switch Sio, the reverse bias refers to a state where the input side voltage is lower than the output side voltage immediately before the commutation operation. The forward bias refers to a state where the input side voltage is higher than the output side voltage immediately before the commutation operation. In the unidirectional switch Soi, the forward bias refers to a state where the input side voltage is lower than the output side voltage immediately before the commutation operation. The reverse bias refers to a state where the input side voltage is higher than the output side voltage immediately before the commutation operation.

Figure 10:
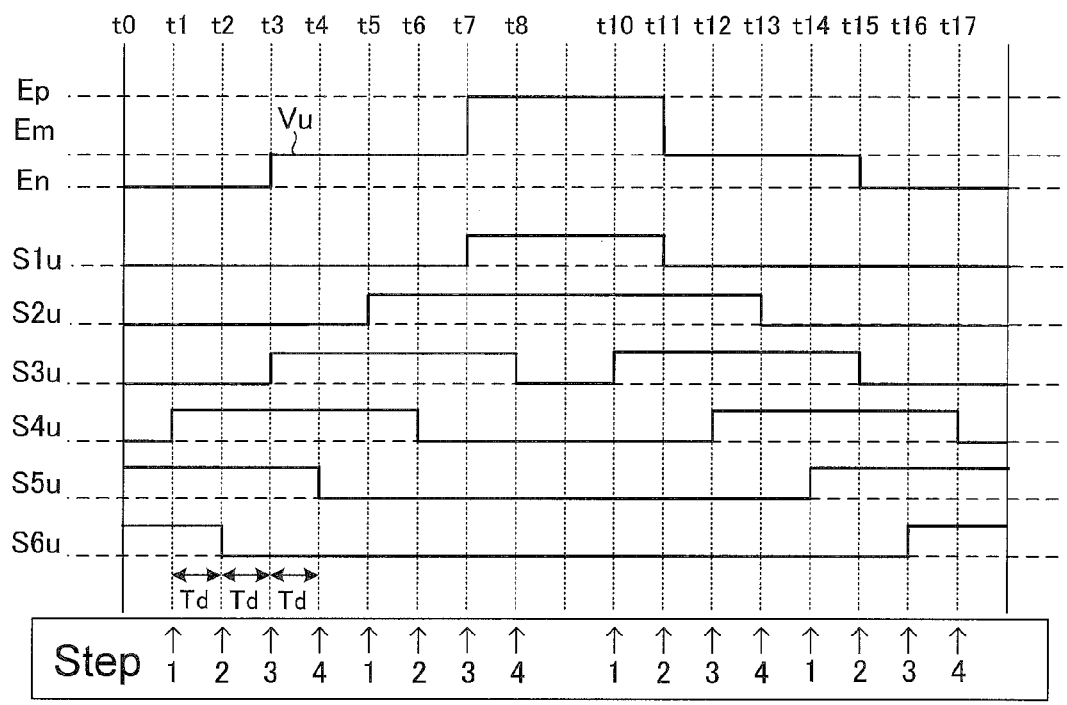
FIG. 10 illustrates a relationship among an output phase voltage, the gate signals, and steps in a commutation operation in a 4-step voltage commutation.
Figure 11:
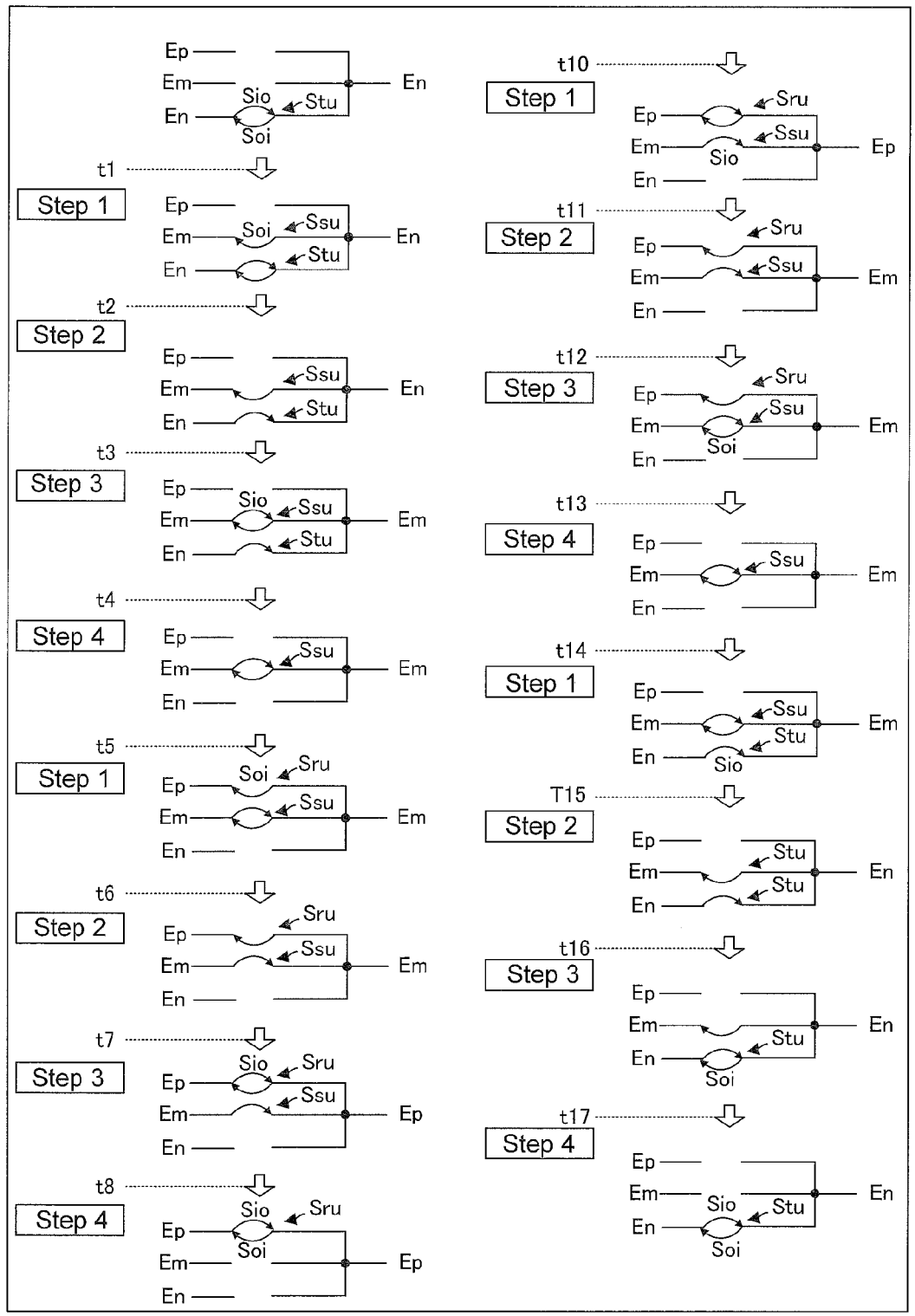
FIG. 11 illustrates a state of the unidirectional switches in the 4-step voltage commutation shown in FIG. 10.

FIG. 10 illustrates a relationship in the 4-step voltage commutation among the output phase voltage Vu, the gate signals S1$u$ to S6$u$, and the steps in the commutation operation. FIG. 11 illustrates states of the unidirectional switches Sio and Soi at time t0 to time t17 shown in FIG. 10. Here, the following applies: Ep=Er, Em=Es, and En=Et.

As shown in FIG. 10, at time t1, the gate signal S4$u$ changes from Low level to High level. This state is as shown in FIG. 11, where the unidirectional switch Soi is turned ON in the bidirectional switch Ssu serving as the switching destination (step 1).

Then, the gate signal S6$u$ changes from High level to Low level at time t2. This state is as shown in FIG. 11, where the unidirectional switch Soi is turned OFF in the bidirectional switch Stu serving as the switching source (step 2).

Then, at time t3, the gate signal S3$u$ changes from Low level to High level. This state is as shown in FIG. 11, where the unidirectional switch Soi is turned ON in the bidirectional switch Ssu (step 3).

Then, at time t4, the gate signal S5$u$ changes from High level to Low level. This state is as shown in FIG. 11, where the unidirectional switch Sio is turned OFF in the bidirectional switch Stu (step 4).

The switching processing at time t5 to time t8, time t10 to time t13, and time t14 to time t17 shown in FIG. 10 is similar to the switching processing of steps 1 to 4 at time t1 to time t4, as shown in FIG. 11. The step time length Td is longer than the turn-ON time and turn-OFF time of the unidirectional switches Sio and Soi. While the steps have the same step time length Td for convenience of description, the steps may have mutually different step time lengths. This also applies in the commutations described below.

Thus, in the commutation control based on the 4-step voltage commutation, the voltage to be output as the output phase voltage Vu is changeable in the order En→Em→Ep→Em→En. At the same time, interphase short-circuiting of the AC power source 2 is eliminated or minimized, and opening of the output phase of the matrix converter 1 is eliminated or minimized.

(3-Step Voltage Commutation)

The 3-step voltage commutation is a 3-step commutation that is based on a relationship in magnitude among the input phase voltages Er, Es, and Et and based on the polarity of the output current Io. This commutation operation is as shown in FIGS. 12A and 12B.

FIGS. 12A and 12B illustrate a relationship in the 3-step voltage commutation between the output phase voltage Vu and the gate signals S1$u$ to S6$u$, and correspond to FIG. 10. FIG. 12A illustrates the commutation operation in a case where the output phase current Iu is a positive value. FIG. 12B illustrates the commutation operation in a case where the output phase current Iu is a negative value.

In the example shown in FIG. 12A, the polarity of the output current Jo is a positive value and the voltage output as the output phase voltage Vu is incremental. In this example, the commutation operation of the 3-step voltage commutation is based on a switching pattern of the following steps 1 to 3.

Step 1: Turn ON the reverse biased unidirectional switch in the switching destination, and turn OFF the reverse biased unidirectional switch in the switching source.

Step 2: Turn ON the forward biased unidirectional switch in the switching destination.

Step 3: Turn OFF the forward biased unidirectional switch in the switching source.

(2-Step Voltage Commutation)

The 2-step voltage commutation is such a method of commutation that the unidirectional switches Sio and Soi of the bidirectional switch S corresponding to the input phase voltage output to the output phase are both ON before and after the commutation operation, while in the remaining bidirectional switches S, only one of the unidirectional switches is ON.

Figure 13:
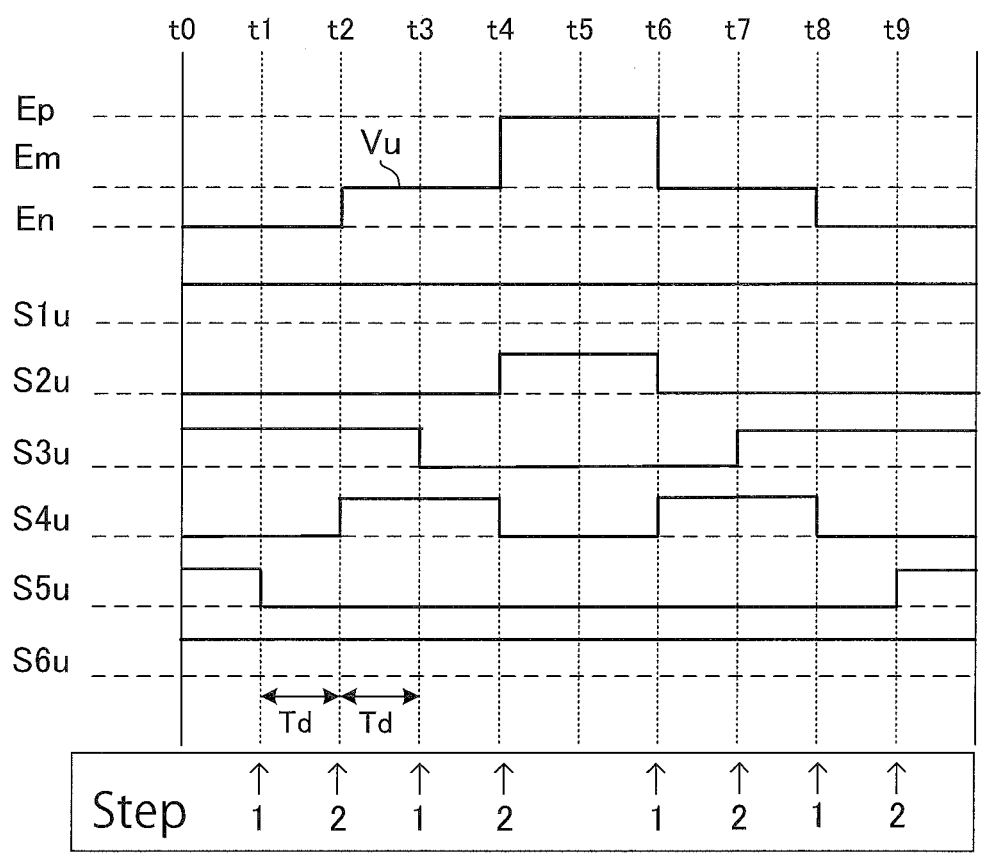
FIG. 13 illustrates a relationship among the output phase voltage, the gate signals, and steps in a commutation operation in a 2-step voltage commutation.

FIG. 13 illustrates a relationship in the 2-step voltage commutation between the output phase voltage Vu and the gate signals S1$u$ to S6$u$, and corresponds to FIG. 10. The step time length Td is longer than the turn-OFF time of the unidirectional switches Sio and Soi.

Figure 14:
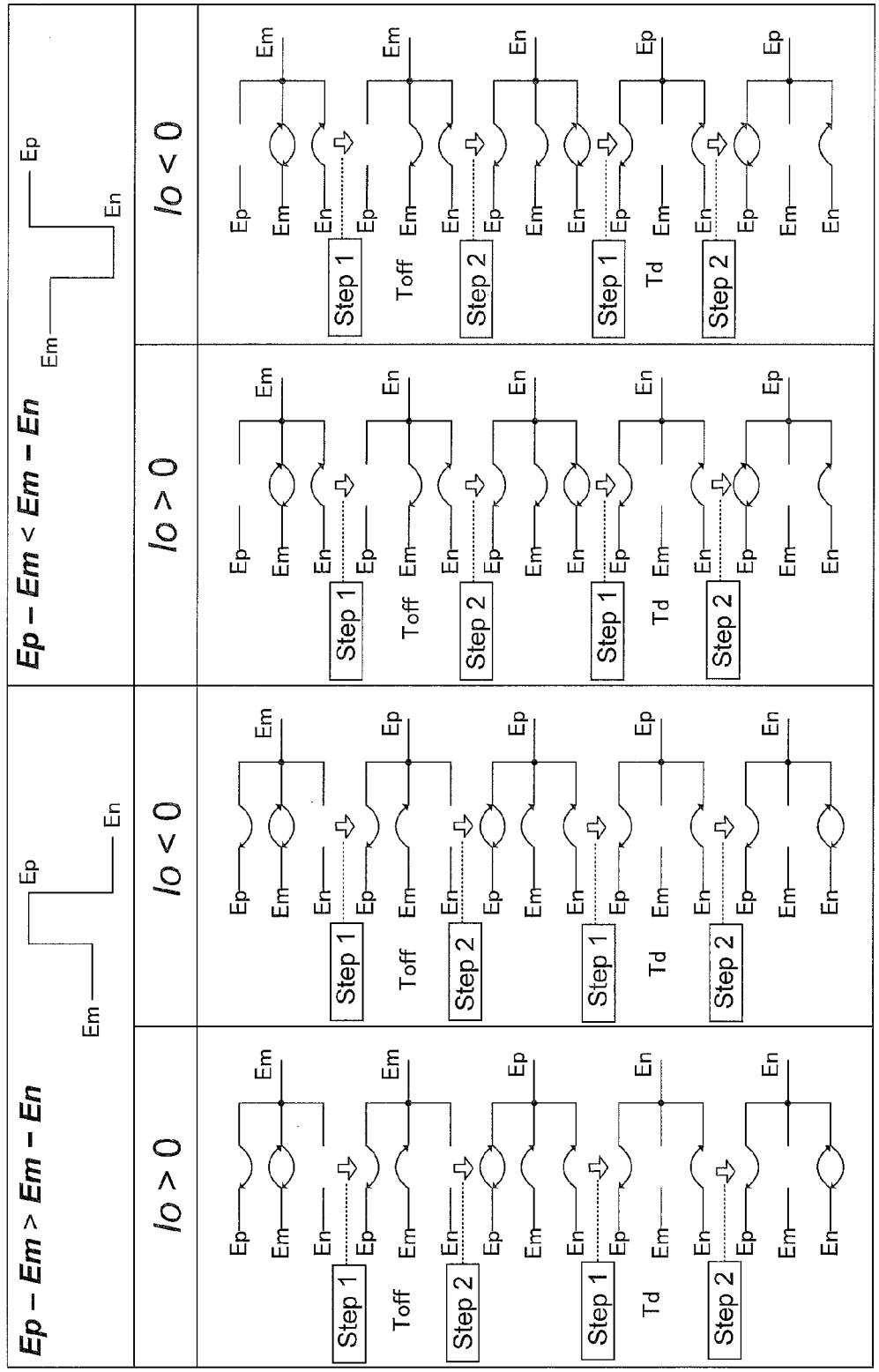
FIG. 14 illustrates states of the unidirectional switches in another 2-step voltage commutation.

The 2-step voltage commutation may be other than the commutation shown in FIG. 13. Another example of the 2-step voltage commutation is shown in FIG. 14. FIG. 14 illustrates states of the unidirectional switches Sio and Soi in the other 2-step voltage commutation. The 2-step voltage commutation shown in FIG. 14 has different switch control patterns, which depend on the relationship in magnitude between EP−Em and Em−En and on the polarity of the output current Io. The step time length Td is longer than the turn-ON time and turn OFF time of the unidirectional switches Sio and Soi. A step time length Toff is longer than the turn-OFF time of the unidirectional switches Sio and Soi.

(4-Step Current Commutation)

In the 4-step current commutation, the commutation operation is based on a switching pattern of the following steps 1 to 4 in accordance with the polarity of the output current Io.

Step 1: Turn OFF one unidirectional switch, among the unidirectional switches of the bidirectional switch S serving as the switching source, that has a polarity opposite to the polarity of the output current Io.

Step 2: Turn ON one unidirectional switch, among the unidirectional switches of the bidirectional switch S serving as the switching destination, that has the same polarity as the polarity of the output current Io.

Step 3: Turn OFF one unidirectional switch, among the unidirectional switches of the bidirectional switch S serving as the switching source, that has the same polarity as the polarity of the output current Io.

Step 4: Turn ON one unidirectional switch, among the unidirectional switches of the bidirectional switch S serving as the switching destination, that has a polarity opposite to the polarity of the output current Io.

FIGS. 15A and 15B illustrate a relationship in the 4-step current commutation between the output phase voltage Vu and the gate signals S1$u$ to S6$u$, and correspond to FIG. 10. FIG. 15A illustrates the commutation operation in a case where the output phase current Iu is a positive value. FIG. 15B illustrates the commutation operation in a case where the output phase current Iu is a negative value.

Thus, in the commutation control based on the 4-step current commutation, the voltage to be output as the output phase voltage Vu is changeable in the order En→Em→Ep→Em→En. At the same time, interphase short-circuiting of the AC power source 2 is eliminated or minimized, and opening of the output phase of the matrix converter 1 is eliminated or minimized.

(3-Step Current Commutation)

Figure 16A:
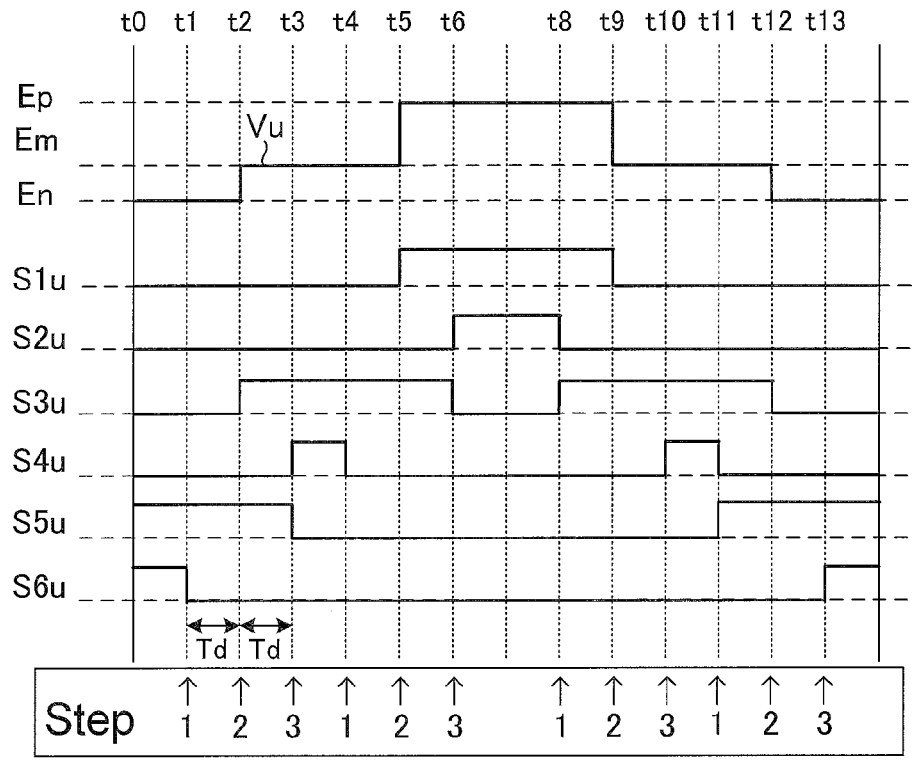
FIG. 16A illustrates a relationship between the output phase voltage and the gate signals in a case where the output phase current is a positive value in a 3-step current commutation.
Figure 16B:
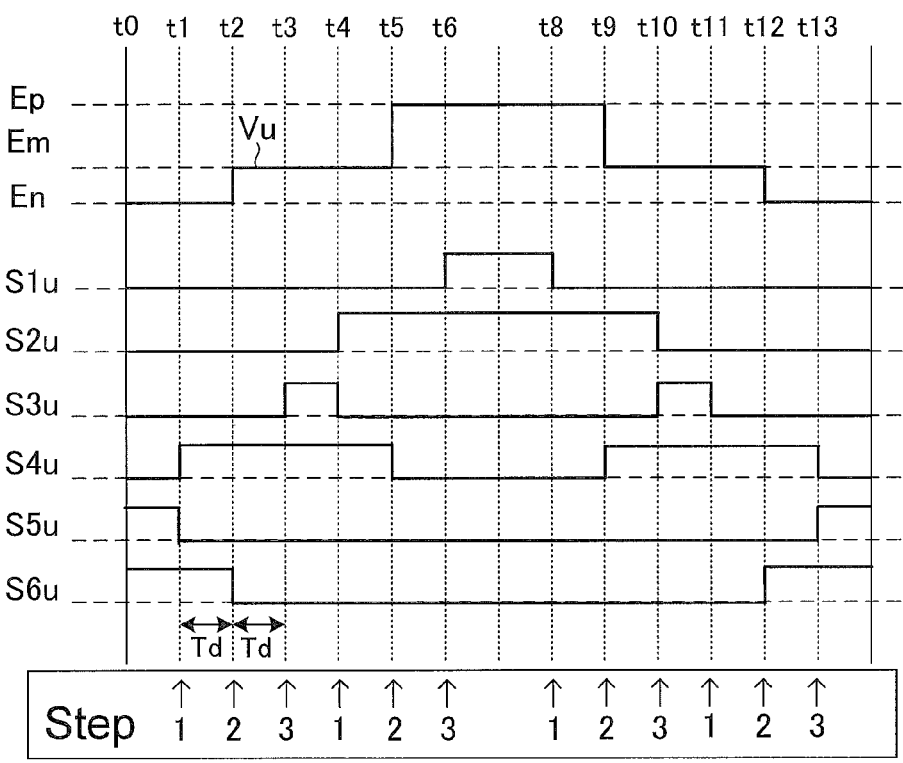
FIG. 16B illustrates a relationship between the output phase voltage and the gate signals in a case where the output phase current is a negative value in the 3-step current commutation.

The 3-step current commutation is a 3-step commutation that is based on the polarity of the output current Io. This commutation operation is as shown in FIGS. 16A and 16B. FIGS. 16A and 16B illustrate a relationship in the 3-step current commutation between the output phase voltage Vu and the gate signals S1$u$ to S6$u$, and correspond to FIG. 10. FIG. 16A illustrates the commutation operation in a case where the output phase current Iu is a positive value. FIG. 16B illustrates the commutation operation in a case where the output phase current Iu is a negative value.

In the exemplary case where the polarity of the output current Io is positive, and where the voltage output as the output phase voltage Vu is switched from high voltage on the input phase side to low voltage using the bidirectional switch S, the commutation operation of the 3-step current commutation is based on a switching pattern of the following steps 1 to 3.

Step 1: Turn OFF one unidirectional switch, among the unidirectional switches of the bidirectional switch S serving as the switching source, that has a polarity opposite to the polarity of the output current Io, and turn ON one unidirectional switch, among the unidirectional switches of the bidirectional switch S serving as the switching destination, that has the same polarity as the polarity of the output current Io.

Step 2: Turn OFF one unidirectional switch, among the unidirectional switches of the bidirectional switch S serving as the switching source, that has the same polarity as the polarity of the output current Io.

Step 3: Turn ON one unidirectional switch, among the unidirectional switches of the bidirectional switch S serving as the switching destination, that has a polarity opposite to the polarity of the output current Io.

The 3-step current commutation may be other than the above-described commutation control. Other examples of the 3-step current commutation are shown in FIGS. 17A and 17B, where steps 2 and 3 of a 4-step current commutation are simultaneously performed as a single step.

FIGS. 17A and 17B illustrate a relationship in the 3-step current commutation between the output phase voltage Vu and the gate signals S1$u$ to S6$u$, and correspond to FIG. 10. FIG. 17A illustrates the commutation operation in a case where the output phase current Iu is a positive value. FIG. 17B illustrates the commutation operation in a case where the output phase current Iu is a negative value.

(3-Step Voltage and Current Commutation)

The 3-step voltage and current commutation is such a method of commutation that one of its step 1 and step 2 is corresponding step 1 or step 2 of the 3-step voltage commutation, while the other one of step 1 and step 2 is corresponding step 1 or step 2 of the 3-step current commutation.

FIGS. 18A and 18B illustrate a relationship in the 3-step voltage and current commutation between the output phase voltage Vu and the gate signals S1$u$ to S6$u$, and correspond to FIG. 10. FIG. 18A illustrates the commutation operation in a case where the output phase current Iu is a positive value. FIG. 18B illustrates the commutation operation in a case where the output phase current Iu is a negative value.

<<2.3.3 Selector 43>>

Next, the selector 43 will be described. Based on the state of the output current Io of the power converter 10, the selector 43 selects between the first commutation controller 41 and the second commutation controller 42 to perform the commutation control. As described above, the first commutation controller 41 performs the commutation control based on the unidirectional switching commutation, while the second commutation controller 42 performs the commutation control based on the bidirectional switching commutation.

As described above, in the unidirectional switching commutation, one unidirectional switch, among the unidirectional switches Sio and Soi of the bidirectional switch S, that corresponds to the polarity of the output current Io is ON-OFF controlled. This shortens the time required for the commutation operation and improves voltage accuracy.

Thus, in the unidirectional switching commutation, one of the unidirectional switches Sio and Soi of the bidirectional switch S is ON before and after the commutation operation. If, however, the polarity of the output current Io is incorrect, no output current Io flows, and this no-flow state continues beyond the period without the commutation operation.

Figure 19A:
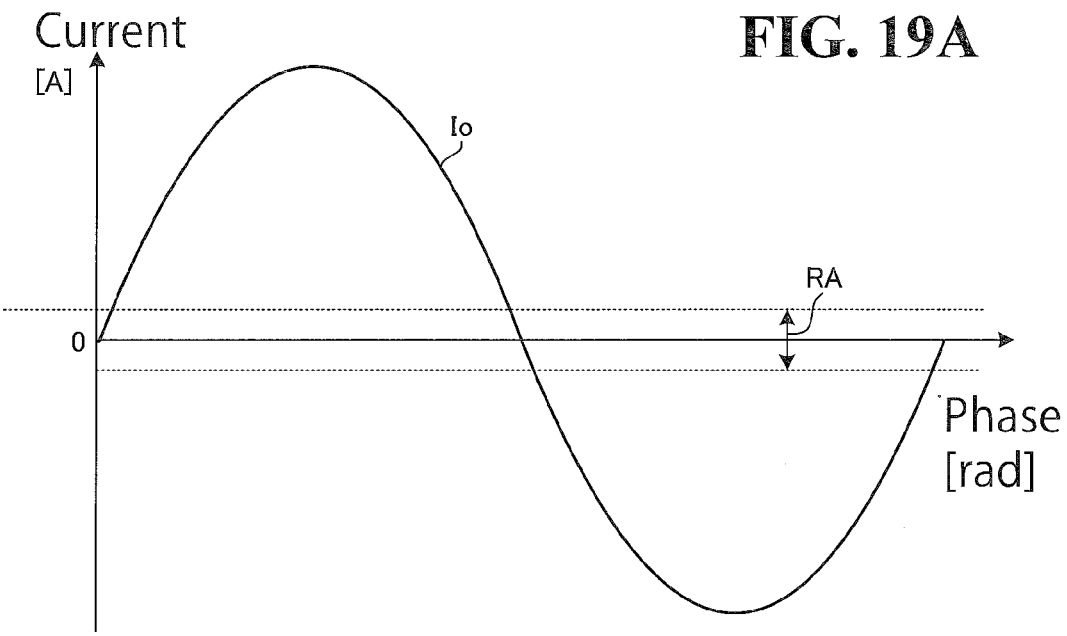
FIG. 19A illustrates a target waveform of the output current.
Figure 19B:
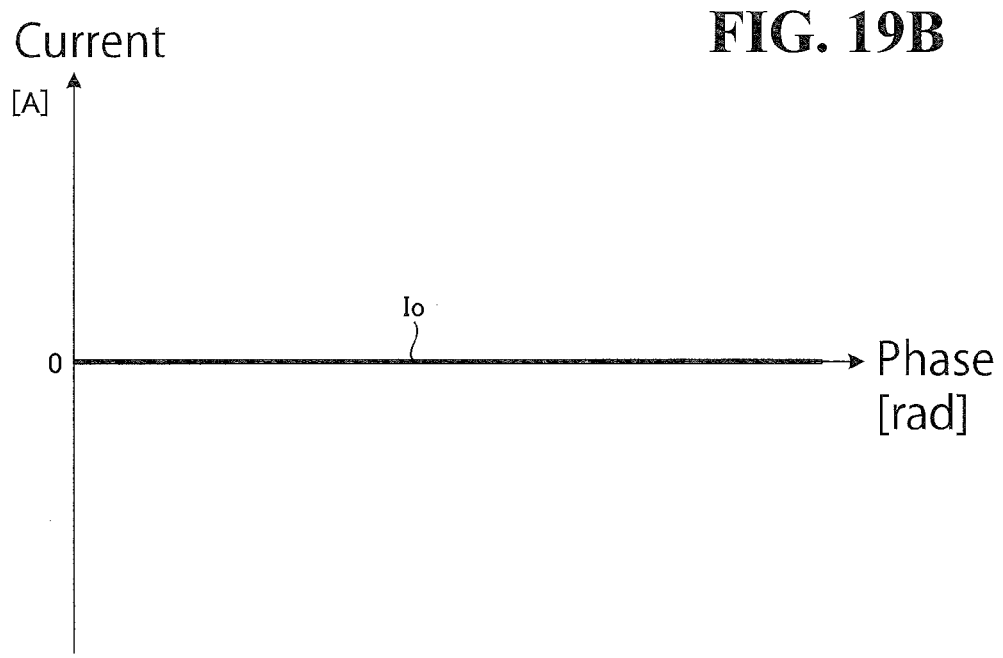
FIG. 19B illustrates an output state of the output current caused by a commutation failure in an unidirectional switching commutation.

As shown in FIG. 19A, a region RA is where the output current Io is small and more susceptible to detection sensitivity and detection noise of the output current detector 13. This leads to cases where no output current Io is output as exemplified in FIG. 19B. FIG. 19A illustrates a target waveform of the output current Io. FIG. 19B illustrates an output state of the output current Io caused by a commutation failure in the unidirectional switching commutation.

In contrast, in the bidirectional switching commutation, the unidirectional switches Sio and Soi of the bidirectional switch S that correspond to the input phase voltage output to the output phase are both ON-controlled before and after the commutation operation. Thus, even if the polarity of the output current Io is incorrect, the bidirectional switching commutation ensures that a resulting commutation failure, if any, is only within the commutation operation period, eliminating or minimizing such occurrences as opening of the output phase and inter-input phase short-circuiting outside the commutation operation period. In the 4-step voltage commutation, even if the polarity of the output current Io is incorrect, no commutation failure occurs.

Thus, the bidirectional switching commutation eliminates or minimizes those situations in which no output current Io is output. However, the bidirectional switching commutation has a larger number of steps than the unidirectional switching commutation does. This elongates the time required for the commutation operation, resulting in degraded voltage accuracy compared with the unidirectional switching commutation. This necessitates voltage compensation processing or similar processing, which makes the bidirectional switching commutation complex.

In view of this, based on the state of the output current Io of the power converter 10, the selector 43 selects between the first commutation controller 41 and the second commutation controller 42 to perform the commutation control. This ensures that the commutation control is based on a suitable commutation method selected between the unidirectional switching commutation and the bidirectional switching. This, in turn, eliminates or minimizes a commutation failure while improving accuracy of the output voltage Vo.

The selector 43 has first selection mode and second selection mode for the commutation controller. The selector 43, by setting its inner parameters, is capable of selecting the commutation controller in any one of first selection mode and second selection mode.

Figure 20:
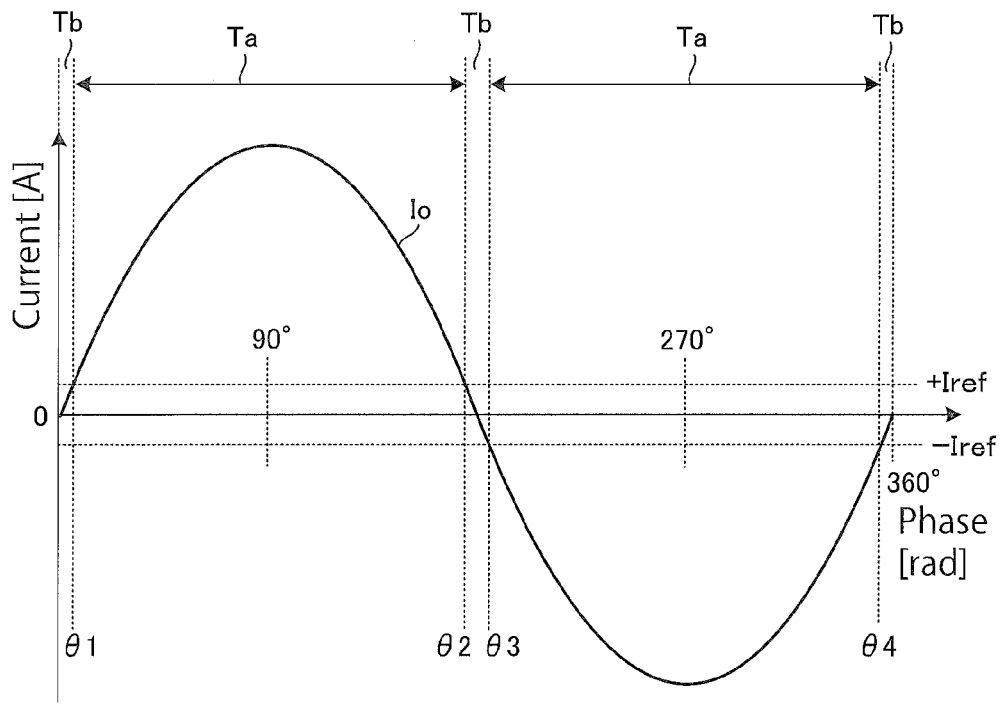
FIG. 20 illustrates a relationship between a commutation controller selected in first selection mode and the output current.

FIG. 20 illustrates a relationship between the output current Io and the commutation controller selected in first selection mode. As shown in FIG. 20, in selecting the commutation controller in first selection mode, the selector 43 selects the first commutation controller 41 in period Ta, during which the output current Io is equal to or larger than a current threshold Iref. In period Tb, during which the output current Io is smaller than the current threshold Iref, the selector 43 selects the second commutation controller 42. In the example shown in FIG. 20, the current threshold Iref is the same throughout the case where the output current Io is a positive value and the case where the output current Io is a negative value. The current threshold Iref may also vary between the case where the output current Io is a positive value and the case where the output current Io is a negative value.

Figure 21:
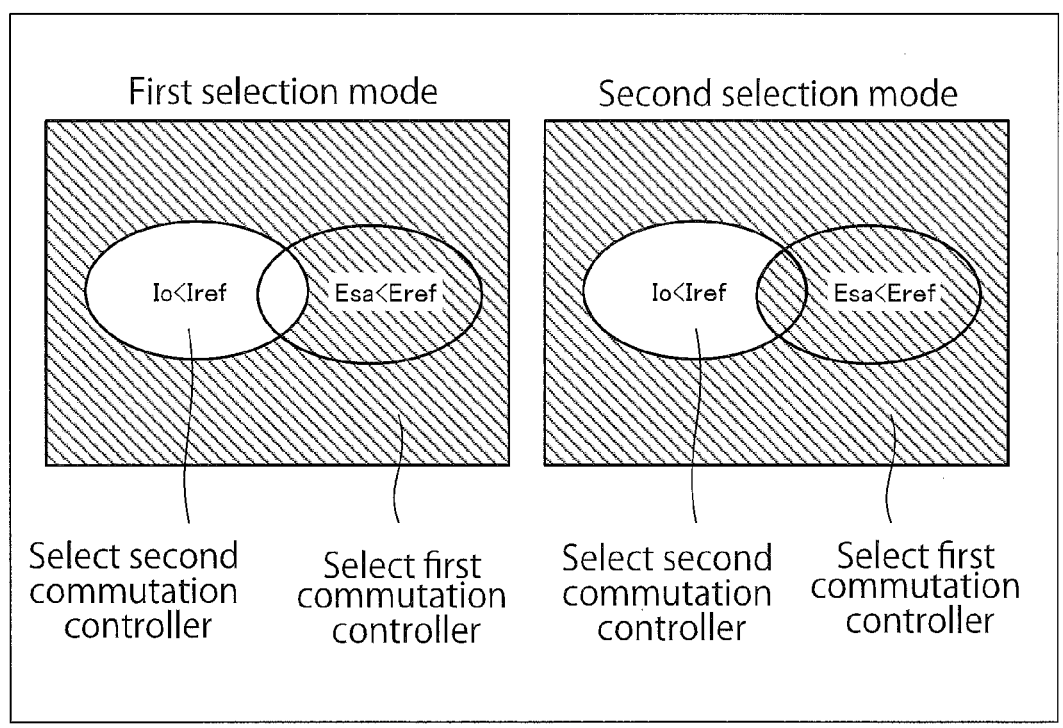
FIG. 21 illustrates a difference between first selection mode and second selection mode.

As shown in FIG. 21, the second selection mode is different from the first selection mode in that the first commutation controller 41 is selected even when the output current Io is smaller than the current threshold Iref, insofar as the inter-input phase voltage Esa is smaller than a voltage threshold Eref. FIG. 21 illustrates a difference between first selection mode and second selection mode. In first selection mode, the prevention of opening of the output phase is prioritized over the prevention of the inter-input phase short-circuiting. In second selection mode, the prevention of inter-input phase short-circuiting is prioritized over the prevention of opening of the output phase.

The bidirectional switching commutation that the second commutation controller 42 uses in the second selection mode eliminates or minimizes inter-input phase short-circuiting. Examples of the bidirectional switching commutation that the second commutation controller 42 uses in the second selection mode include the 4-step current commutation shown in FIG. 15A and other drawings, and the 2-step current commutation shown in FIG. 14.

In selecting the commutation controller in second selection mode, the selector 43 selects the first commutation controller 41 when the output current Io is equal to or larger than the current threshold Iref, or when the output current Io is smaller than the current threshold Iref and the inter-input phase voltage Esa is smaller than a voltage threshold Eref. The selector 43 selects the second commutation controller 42 when the output current Io is smaller than the current threshold Iref and the inter-input phase voltage Esa is equal to or larger than the voltage threshold Eref. The current threshold Iref and the voltage threshold Eref each may vary between the case where the output current Io is a positive value and the case where the output current Io is a negative value.

Figure 22:
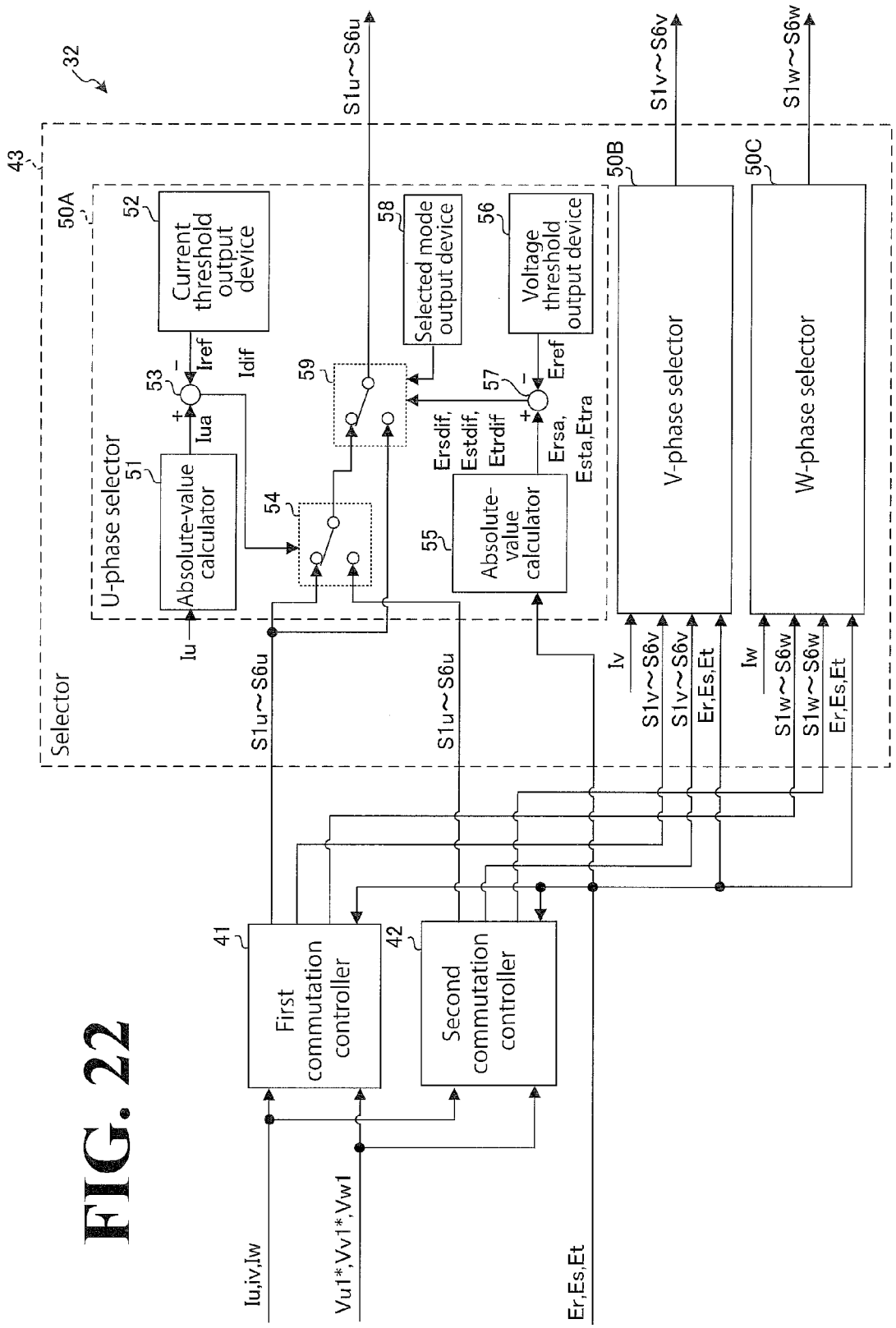
FIG. 22 is a diagram illustrating a configuration of a selector shown in FIG. 3.

FIG. 22 illustrates a configuration of the selector 43. As shown in FIG. 22, the selector 43 includes a U-phase selector 50A, a V-phase selector 50B, and a W-phase selector 50C. The U-phase selector 50A selects one of the first and second commutation controllers 41 and 42 based on the magnitude of the output phase current Iu, and outputs the gate signals S1$u$ to S6$u$ output from the selected commutation controller.

The V-phase selector 50B selects one of the first and second commutation controllers 41 and 42 based on the magnitude of the output phase current Iv, and outputs the gate signals S1$v$ to S6$v$ output from the selected commutation controller. The W-phase selector 50C selects one of the first and second commutation controllers 41 and 42 based on the magnitude of the output phase current Iw, and outputs the gate signals S1$w$ to S6$w$ output from the selected commutation controller.

A configuration of the U-phase selector 50A will be described in detail below. The configurations of the V-phase selector 50B and W-phase selector 50C are the same as the configuration of the U-phase selector 50A, and thus will not be described.

As shown in FIG. 22, the U-phase selector 50A includes absolute-value calculators 51 and 55, a current threshold output device 52, subtractors 53 and 57, switches 54 and 59, a voltage threshold output device 56, and a selected mode output device 58.

The absolute-value calculator 51 calculates an absolute value Iua of the output phase current Iu to obtain the magnitude of the output phase current Iu, and outputs the absolute value Iua to the subtractor 53. The current threshold output device 52 outputs the current threshold Iref, which is set in advance, to the subtractor 53. The subtractor 53 subtracts the current threshold Iref from the absolute value Iua, and outputs a difference Idif to the switch 54.

The switch 54 receives the gate signals S1u to S6u from each of the first and second commutation controllers 41 and 42, and outputs the gate signals S1u to S6u from one of the commutation controllers based on the difference Idif output from the subtractor 53. Specifically, when the difference Idif is 0 or a positive value, the switch 54 selects and outputs the gate signals S1u to S6u output from the first commutation controller 41. When the difference Idif is a negative value, the switch 54 selects and outputs the gate signals S1u to S6u output from the second commutation controller 42.

The absolute-value calculator 55 receives the input phase voltages Er, Es, and Et, and obtains absolute values of the inter-input phase voltages Ers, Est, and Etr from the input phase voltages Er, Es, and Et. The inter-input phase voltage Ers is a voltage between the R and S phases. The inter-input phase voltage Est is a voltage between the S and T phases. The inter-input phase voltage Etr is a voltage between the T and R phases.

The voltage threshold output device 56 calculates the absolute values Ersa, Esta, and Etra respectively of the inter-input phase voltages Ers, Est, and Etr to obtain the magnitudes of the inter-input phase voltages Ers, Est, and Etr, and outputs the absolute values Ersa, Esta, and Etra to the subtractor 53. The voltage threshold output device 56 outputs the voltage threshold Eref, which is set in advance, to the subtractor 57.

The subtractor 57 subtracts the voltage threshold Eref from each of the inter-input phase voltages Ersa, Esta, and Etra, and outputs differences Ersdif, Estdif, and Etrdif to the switch 59. The selected mode output device 58 outputs mode information to the switch 59. The mode information indicates which of the selection mode, first selection mode or second selection mode, is set as a parameter.

The switch 59 receives the output from the switch 54 and the output from the first commutation controller 41. Then, based on the differences from the subtractor 57 and based on the mode information from the selected mode output device 58, the switch 59 selects and outputs one of the outputs from the switch 54 and the first commutation controller 41.

Specifically, when the mode information output from the selected mode output device 58 indicates first selection mode, the switch 59 selects and outputs the output from the switch 54. Then, when the output current Io is equal to or larger than the current threshold Iref, the gate signal Sg from the first commutation controller 41 is output. When the output current Io is smaller than the current threshold Iref, the gate signal Sg from the second commutation controller 42 is output.

When the mode information output from the selected mode output device 58 indicates second selection mode, the switch 59 selects and outputs the output from the switch 54 or the output from the first commutation controller 41 based on the differences from the subtractor 57.

For example, in the case of a commutation from the input phase voltage En to the input phase voltage Em under the condition of Ep=Er, Em=Es, and En=Et, the switch 59 selects and outputs the gate signals S1u to S6u output from the switch 54 when the difference Estdif is 0 or a positive value. When the difference Estdif is a negative value, the switch 59 selects and outputs the gate signals S1u to S6u output from the first commutation controller 41.

In the case of a commutation from the input phase voltage Em to the input phase voltage Ep under the condition of Ep=Er, Em=Es, and En=Et, the switch 59 selects and outputs the gate signals S1u to S6u output from the switch 54 when the difference Ersdif is 0 or a positive value. When the difference Ersdif is a negative value, the switch 59 selects and outputs the gate signals S1u to S6u output from the first commutation controller 41.

Thus, based on the magnitude of the output current Io and the magnitude of the inter-input phase voltage Esa, the selector 43 selects between the first commutation controller 41 and the second commutation controller 42 to perform the commutation control. This enables the matrix converter 1 to eliminate or minimize a commutation failure while improving the accuracy of the output voltage Vo.

Figure 23:
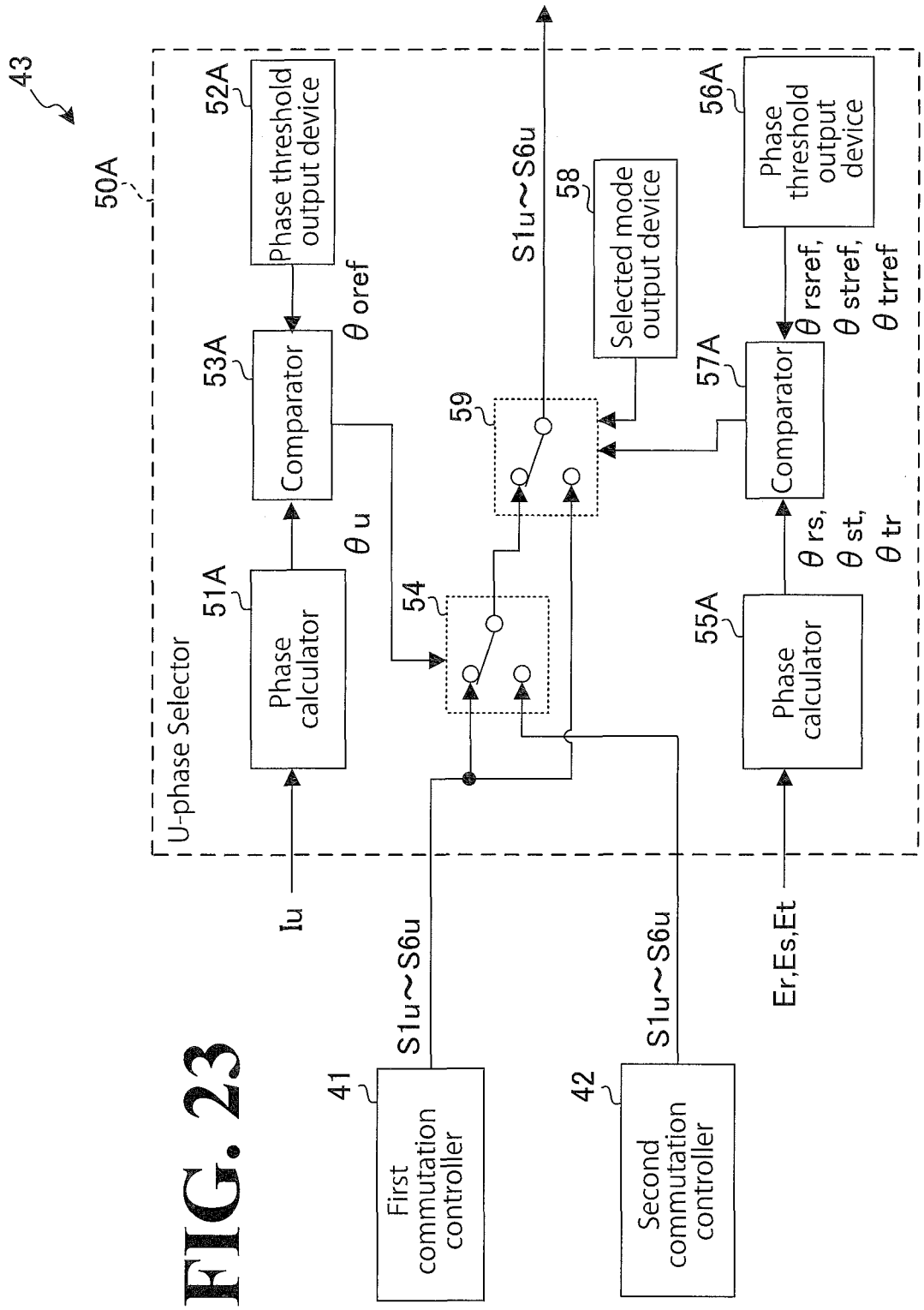
FIG. 23 is a diagram illustrating another configuration of the selector shown in FIG. 3.

While in the above-described embodiment the commutation controller is selected based on the magnitude of the output current Io, it is also possible to select the commutation controller based on the phase of the output current Io. FIG. 23 illustrates another configuration of the U-phase selector 50A in the selector 43. The configurations of the V-phase selector 50B and the W-phase selector 50C are the same as the configuration of the U-phase selector 50A.

As shown in FIG. 23, the U-phase selector 50A includes phase calculators 51A and 55A, phase threshold output devices 52A and 56A, and comparators 53A and 57A, instead of the absolute-value calculators 51 and 55, the current threshold output device 52, the voltage threshold output device 56, and the subtractors 53 and 57 shown in FIG. 22. The U-phase selector 50A is otherwise similar to the configuration shown in FIG. 22.

The phase calculator 51A receives the output phase current Iu to obtain a phase θu of the output phase current Iu. The phase calculator 51A may also obtain the phase θu of the output phase current Iu from any one of the output phase currents Iv and Iw.

The phase threshold output device 52A outputs a phase threshold θoref. Examples of the range of the phase threshold θoref are shown in FIG. 20: "0° to θ1", "θ2 to θ3", and "θ4 to 360°". The comparator 53A compares the phase θu of the output phase current Iu output from the phase calculator 51A with the phase threshold θoref output from the phase threshold output device 52A. When the phase θu is contained in the phase threshold θoref, the comparator 53A outputs a negative signal. When the phase θu is not contained in the phase threshold θoref, the comparator 53A outputs a positive signal.

The phase calculator 55A receives the input phase voltages Er, Es, and Et to obtain a phase θi of the input voltage Vi. The phase calculator 55A may also obtain the phase θi of the input voltage Vi from any one of the input phase voltages Er, Es, and Et.

The phase threshold output device 56A outputs phase thresholds θrsref, θstref, and θtrref respectively for the inter-input phase voltages Ers, Est, and Etr. The phase threshold θrsref is set within such an example range of the phase θi that the absolute value of the inter-input phase voltage Ers is equal to or smaller than the voltage threshold Eref. The phase threshold θstref is set within such an example range of the phase θi that the absolute value of the inter-input phase voltage Est is equal to or smaller than the voltage threshold Eref. The phase threshold θtrref is set within such an example range of the phase θi that the absolute value of the inter-input phase voltage Etr is equal to or smaller than the voltage threshold Eref.

The comparator 57A compares the phase θi of the input voltage V1 output from the phase calculator 55A with each of the thresholds θrsref, θstref, and θtrref output from the phase threshold output device 56A. When the phase θi is contained in the phase threshold θrsref, the comparator 57A outputs a negative signal associated with the inter-input phase voltage Ers. When the phase θi is not contained in the phase threshold θrsref, the comparator 57A outputs a positive signal associated with the inter-input phase voltage Ers.

When the phase θi is contained in the phase threshold θstref, the comparator 57A outputs a negative signal associated with the inter-input phase voltage Est. When the phase θi is not contained in the phase threshold θstref, the comparator 57A outputs a positive signal associated with the inter-input phase voltage Est. When the phase θi is contained in the phase threshold θtrref, the comparator 57A outputs a negative signal associated with the inter-input phase voltage Etr. When the phase θi is not contained in the phase threshold θtrref, the comparator 57A outputs a positive signal associated with the inter-input phase voltage Etr.

In the case of a commutation from the input phase voltage Er to the input phase voltage Es in the U phase for example, the switch 59 selects and outputs the gate signals S1u to S6u output from the switch 54 when the positive signal associated with the inter-input phase voltage Ers is output from the comparator 57A. When the negative signal associated with the inter-input phase voltage Ers is output from the comparator 57A, the switch 59 selects and outputs the gate signals S1u to S6u output from the first commutation controller 41.

Similarly, in the case of a commutation between the input phase voltage Es and the input phase voltage Et, the switch 59 makes a selection based on signals associated with the inter-input phase voltage Est. In the case of a commutation between the input phase voltage Et and the input phase voltage Er, the switch 59 makes a selection based on signals associated with the inter-input phase voltage Etr.

Thus, the selector 43 is capable of selecting between the first commutation controller 41 and the second commutation controller 42 to perform the commutation control based on the phase of the output current Io and the phase of the input voltage P.

The selector 43 will not be limited to the above-described configuration. Another possible example is that the phase selectors 50A to 50C obtain the phase θo of the output current Io for the state of the output current Io, while for the state of the inter-input phase voltage Esa, the phase selectors 50A to 50C obtain the inter-input phase voltage Esa. In this case, the phase selectors 50A to 50C may obtain the phase θo of the output current Io at the phase calculator 51A, the phase threshold output device 52A, and the comparator 53A. Then, at the absolute-value calculator 55, the voltage threshold output device 56, and the subtractor 57, the phase selectors 50A to 50C may obtain the magnitude of the inter-input phase voltage Esa.

The phase selectors 50A to 50C may also obtain the magnitude of the output current Io for the state of the output current Io, and obtain the phase θi of the input voltage V1 for the state of the inter-input phase voltage Esa. In this case, the phase selectors 50A to 50C each may obtain the magnitude of the output current Io at the absolute-value calculator 51, the current threshold output device 52, and the subtractor 53, and obtain the phase θi of the input voltage V1 at the phase calculator 55A, the phase threshold output device 56A and the comparator 57A.

Figure 24:
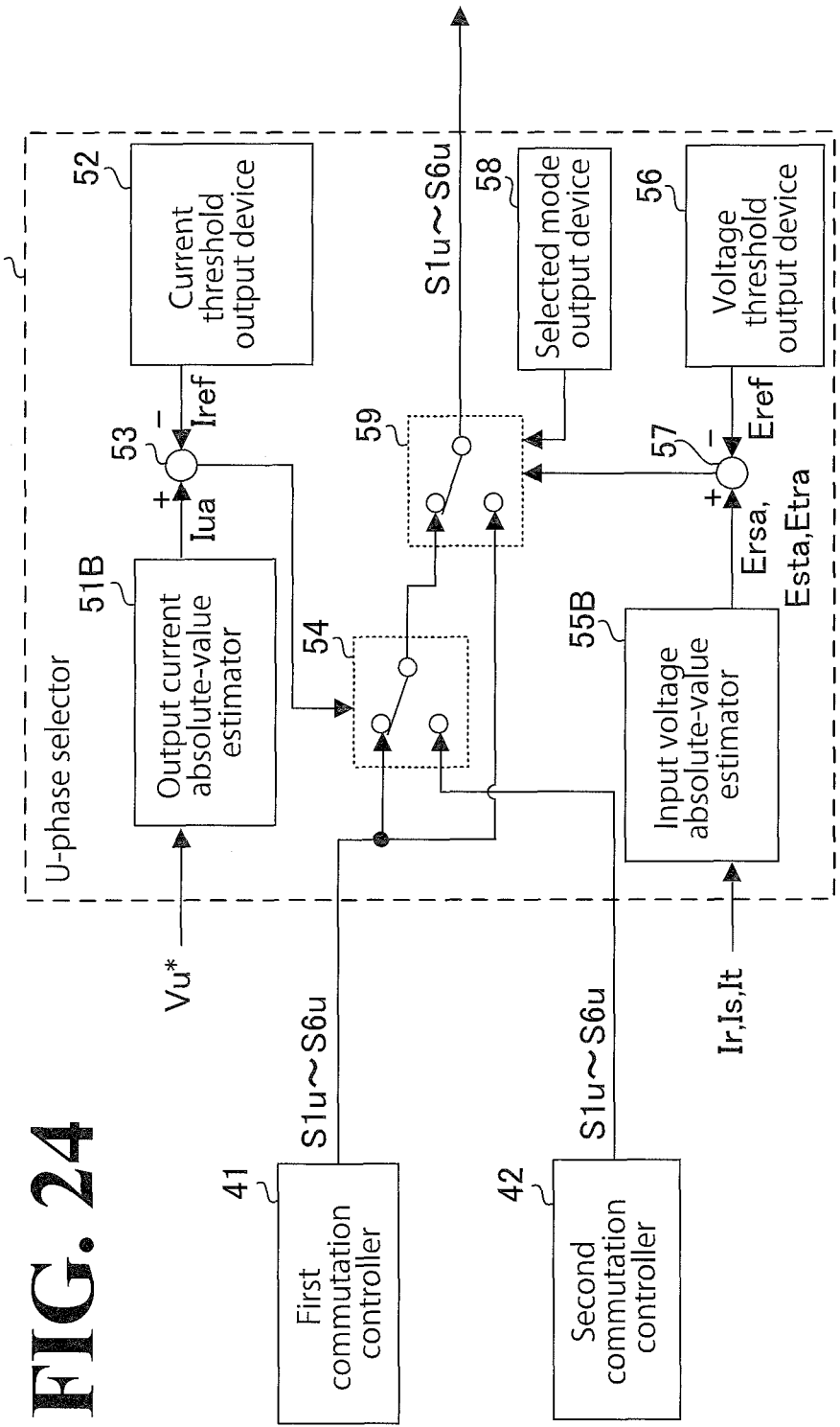
FIG. 24 is a diagram illustrating a still another configuration of the selector shown in FIG. 3.

The selector 43 has been described as determining the states of the inter-input phase voltage Esa and the output current Io based on a detected value. As shown in FIG. 24, it is also possible to use an input voltage estimator to estimate the state of the inter-input phase voltage Esa, and use an output current estimator to estimate the state of the output current Io. FIG. 24 illustrates a still another configuration of the U-phase selector 50A in the selector 43. The configurations of the V-phase selector 50B and the W-phase selector 50C are the same as the configuration of the U-phase selector 50A.

As shown in FIG. 24, the U-phase selector 50A includes an output current absolute-value estimator 51B and an input voltage absolute-value estimator 55B, instead of the absolute-value calculators 51 and 55 shown in FIG. 22. The U-phase selector 50A is otherwise similar to the configuration shown in FIG. 22.

The output current absolute-value estimator 51B obtains the absolute value Iua of the output phase current Iu from the voltage command Vo*. For example, the output current absolute-value estimator 51B includes a table or a formula indicating the relationship between the voltage command Vu* and the absolute value Iua of the output phase current Iu. Based on the table or the formula, the output current absolute-value estimator 51B obtains the absolute value Iua of the output phase current Iu.

For example, the input voltage absolute-value estimator 55B estimates the absolute values Ersa, Esta, and Etra of the inter-input phase voltages Ers, Est, and Etr based on an input current Ii output from an input current estimator (not shown). For example, the input voltage absolute-value estimator 55B includes a table or a formula indicating the relationship between the input phase current Ir and the absolute value of the input phase voltage Er. Based on the table or the formula, the input voltage absolute-value estimator 55B obtains the absolute values Ersa, Esta, and Etra of the inter-input phase voltages Ers, Est, and Etr.

As has been described hereinbefore, the matrix converter 1 according to this embodiment determines the state of the inter-input phase voltage Esa and the state of the output current Io based on a detected value or an estimated value. Then, the matrix converter 1 selects between the first commutation controller 41 and the second commutation controller 42 to perform the commutation control. This enables the matrix converter 1 to eliminate or minimize a commutation failure while improving the accuracy of the output voltage Vo.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A matrix converter comprising:
    a power converter comprising a plurality of bidirectional switches including unidirectional switches connected in anti-parallel pairs, each bidirectional switch having a controllable conducting direction, the bidirectional switches being disposed between a plurality of input terminals and a plurality of output terminals, the plurality of input terminals being respectively coupled to phases of an AC power source, the plurality of output terminals being respectively coupled to phases of a load; and a controller configured to control the plurality of bidirectional switches, the controller comprising:
  a first commutation controller configured to perform commutation control in which the conducting direction of the bidirectional switches is unidirectional by maintaining one of the unidirectional switches in a nonconducting state;
  a second commutation controller configured to perform the commutation control in which the conducting direction of the bidirectional switches is bidirectional; and
  a selector configured to select between the first commutation controller and the second commutation controller to perform the commutation control based on a state of an output current from the power converter.

2. The matrix converter according to claim 1, wherein the state of the output current comprises a detected value or an estimated value of at least one of a magnitude of the output current and a phase of the output current.

3. A matrix converter comprising:
a power converter comprising a plurality of bidirectional switches each having a controllable conducting direction, the bidirectional switches being disposed between a plurality of input terminals and a plurality of output terminals, the plurality of input terminals being respectively coupled to phases of an AC power source, the plurality of output terminals being respectively coupled to phases of a load; and
a controller configured to control the plurality of bidirectional switches, the controller comprising:
  a first commutation controller configured to perform commutation control in a state where the conducting direction of the bidirectional switches is unidirectional;
  a second commutation controller configured to perform the commutation control in a state where the conducting direction of the bidirectional switches is bidirectional; and
  a selector configured to select between the first commutation controller and the second commutation controller to perform the commutation control based on a state of an output current from the power converter,
wherein the state of the output current comprises a detected value or an estimated value of at least one of a magnitude of the output current and a phase of the output current,
wherein the selector is configured to select the first commutation controller when the magnitude of the output current is equal to or larger than a predetermined current threshold or when the magnitude of the output current is smaller than the predetermined current threshold and a magnitude of an inter-phase voltage of the AC power source is smaller than a predetermined voltage threshold, and
wherein the selector is configured to select the second commutation controller when the magnitude of the output current is smaller than the predetermined current threshold and the magnitude of the inter-phase voltage is equal to or larger than the predetermined voltage threshold.

4. A matrix converter comprising:
a power converter comprising a plurality of bidirectional switches each having a controllable conducting direction, the bidirectional switches being disposed between a plurality of input terminals and a plurality of output terminals, the plurality of input terminals being respectively coupled to phases of an AC power source, the plurality of output terminals being respectively coupled to phases of a load; and
a controller configured to control the plurality of bidirectional switches, the controller comprising:
  a first commutation controller configured to perform commutation control in a state where the conducting direction of the bidirectional switches is unidirectional;
  a second commutation controller configured to perform the commutation control in a state where the conducting direction of the bidirectional switches is bidirectional; and
  a selector configured to select between the first commutation controller and the second commutation controller to perform the commutation control based on a state of an output current from the power converter,
wherein the state of the output current comprises a detected value or an estimated value of at least one of a magnitude of the output current and a phase of the output current,
wherein the selector is configured to select the first commutation controller when the magnitude of the output current is equal to or larger than a predetermined current threshold, and
wherein the selector is configured to select the second commutation controller when the magnitude of the output current is smaller than the predetermined current threshold.

5. A matrix converter comprising:
a power converter comprising a plurality of bidirectional switches including unidirectional switches connected in anti-parallel pairs, each bidirectional switch having a controllable conducting direction, the bidirectional switches being disposed between a plurality of input terminals and a plurality of output terminals, the plurality of input terminals being respectively coupled to phases of an AC power source, the plurality of output terminals being respectively coupled to phases of a load; and
controlling means for controlling the plurality of bidirectional switches, the controlling means comprising:
  first commutation controlling means for performing commutation control in which the conducting direction of the bidirectional switches is unidirectional by maintaining one of the unidirectional switches in a nonconducting state;
  second commutation controlling means for performing the commutation control in which the conducting direction of the bidirectional switches is bidirectional; and
  selecting means for selecting between the first commutation controlling means and the second commutation controlling means to perform the commutation control based on a state of an output current from the power converter.

6. The matrix converter according to claim 1, wherein the selector is configured to select between the first commutation controller and the second commutation controller to switch between forwarding the output of the first commutation controller and forwarding the output of the second commutation controller.

7. The matrix converter according to claim 1, wherein the selector comprises a plurality of selectors, each of the plurality of selectors corresponding to a respective phase of the AC power source.

8. The matrix converter according to claim 5, wherein the selecting means is configured to select between the first commutation controlling means and the second commutation controlling means to switch between forwarding the output of the first commutation controlling means and forwarding the output of the second commutation controlling means.

9. The matrix converter according to claim 5, wherein the selecting means comprises a plurality of selecting means, each of the plurality of selecting means corresponding to a respective phase of the AC power source.

* * * * *